US008862662B2

(12) United States Patent
Kao et al.

(10) Patent No.: US 8,862,662 B2
(45) Date of Patent: Oct. 14, 2014

(54) DETERMINATION OF LATENT INTERACTIONS IN SOCIAL NETWORKS

(71) Applicant: The Boeing Company, Chicago, IL (US)

(72) Inventors: Anne Kao, Bellevue, WA (US); William R. Ferng, Sammamish, WA (US); Stephen R. Poteet, Bellevue, WA (US); Lesley Quach, Seattle, WA (US); Rodney Allen Tjoelker, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 115 days.

(21) Appl. No.: 13/663,312

(22) Filed: Oct. 29, 2012

(65) Prior Publication Data

US 2014/0122586 A1 May 1, 2014

(51) Int. Cl.
*G06F 15/16* (2006.01)

(52) U.S. Cl.
USPC ............ 709/203; 709/206; 709/217; 709/223

(58) Field of Classification Search
CPC ................................ H04L 51/32; H04L 67/02
USPC .................. 709/223, 224, 203, 206, 217, 219
See application file for complete search history.

(56) References Cited

U.S. PATENT DOCUMENTS 8,204,988 B2 6/2012 Lin et al.
8,346,708 B2 * 1/2013 Chi et al. ........................ 706/52
2006/0184464 A1 * 8/2006 Tseng et al. .................... 706/14
2008/0120261 A1 * 5/2008 John et al. ........................ 706/45
2010/0185578 A1 * 7/2010 Chi et al. ........................ 706/52
2010/0312797 A1 * 12/2010 Peng ............................. 707/776
2012/0089690 A1 * 4/2012 Hein et al. .................... 709/206
2012/0185578 A1 * 7/2012 Perkuhn et al. ............... 709/223
2012/0226651 A1 * 9/2012 Chidlovskii .................... 706/52
2013/0031176 A1 * 1/2013 Shih et al. ..................... 709/204
2013/0103371 A1 * 4/2013 Huang et al. ...................... 703/2

OTHER PUBLICATIONS

"Social network analysis software," Wikipedia, http://en.wikipedia.org/wiki/Social_network_analysis_software, retrieved Jul. 31, 2012, 41 pages.
Acar et al., "Modeling and multiway analysis of chatroom tensors," IEEE International Conference on Intelligent and Security Informatics, Lecture Notes in Computer Science, vol. 3495, Feb. 2006, pp. 256-268.

(Continued)

*Primary Examiner* — Lashonda Jacobs
(74) *Attorney, Agent, or Firm* — Yee & Associates, P.C.

(57) ABSTRACT

A method including processing social network data to establish a tensor model of the social network data, the tensor model having at least an order of four. The tensor model is decomposed into a plurality of principal factors. A summary tensor is synthesized from a subset of the plurality of principal factors. The summary tensor represents a plurality of relationships among a plurality of entities in the tensor model. A synthesis of relationships is formed and stored. At least one parameter is identified using one of the summary tensor and a single principal factor in the subset. The at least one parameter is selected from the group consisting of: a correlation among the plurality of entities, a similarity between two of the plurality of entities, and a time-based trend of changes in the synthesis of relationships. The at least one parameter is communicated.

20 Claims, 15 Drawing Sheets

(56) References Cited

OTHER PUBLICATIONS

Chi et al., "FacetCube: A framework of incorporating prior knowledge into nonnegative tensor factorization," Proceedings of the 19th ACM Conference on Information and Knowledge Management, Nov. 2010., 10 pages.
Dunlavy et al., "Multilinear Algebra for Analyzing Data With Multiple Linkages," Sandia Tech Report SAND2006-2079, Chapter 7, Apr. 2006, pp. 85-114.
Kolda et al., "Higher-order web link analysis using multilinear algebra," Fifth IEEE International Conference on Data Mining, Nov. 2005, 8 pages.
Rettinger et al., "Context-aware tensor decomposition for relation prediction in social networks," Social Network Analysis and Mining, Apr. 2012, 14 pages.
Sun et al., "MultiVis: Content-based social network exploration through multi-way visual analysis," 2009 SIAM International Conference on Data Mining, Apr. 2009, pp. 1064-1075.

* cited by examiner

FIG. 11

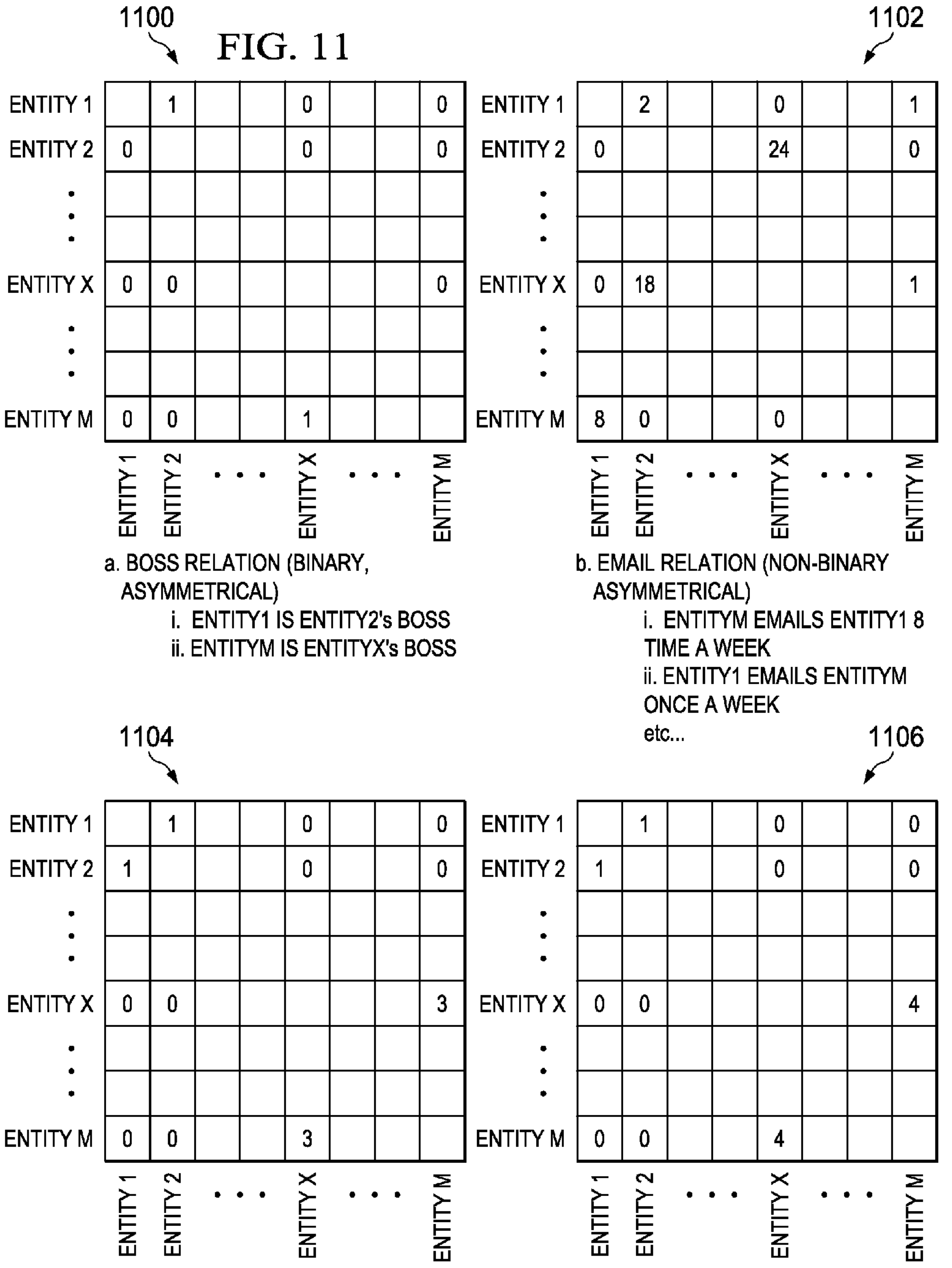

a. BOSS RELATION (BINARY, ASYMMETRICAL)
i. ENTITY1 IS ENTITY2's BOSS
ii. ENTITYM IS ENTITYX's BOSS b. EMAIL RELATION (NON-BINARY ASYMMETRICAL)
i. ENTITYM EMAILS ENTITY1 8 TIME A WEEK
ii. ENTITY1 EMAILS ENTITYM ONCE A WEEK
etc...

c. EYE COLOR (NON-BINARY, SYMMETRICAL)
i. ENTITY1 AND ENTITY2 HAVE BROWN EYES
ii. ENTITYX AND ENTITYM HAVE BLUE EYES d. HEIGHT PROPERTY (NON-BINARY SYMMETRICAL)
i. ENTITY1 IS 5'8; ENTITY2 IS 5'9
ii. ENTITYX IS 6'3; ENTITYM IS 6'4

DETERMINATION OF LATENT INTERACTIONS IN SOCIAL NETWORKS

This application was made with United States Government support under contract number N00014-09-C-0082 awarded by the United States Office of Naval Research. The United States Government has certain rights in this application.

BACKGROUND INFORMATION

1. Field

The present disclosure relates generally to social network analytics.

2. Background

Social network analysis software facilitates quantitative analysis of social networks by describing network features via numerical or visual representation. Social networks may include groups such as families, a group of individuals identifying themselves as friends, project teams, classrooms, sports teams, legislatures, nation-states, membership on networking websites like TWITTER® or FACEBOOK®.

Some social network analysis software can generate social network features from raw social network data formatted in an edge list, adjacency list, or adjacency matrix or sociomatrix. These social network features may be presented using some kind of visualization. Some social network analysis software can perform predictive analysis. Predictive analysis, such as peer influence modeling or contagion modeling, may use social network phenomena such as a tie to predict social network outcomes. An example of predictive analysis is to use individual level phenomena to predict the formation of a tie or edge.

When analyzing many social networks, an analyst may desire to include many different parameters simultaneously, though in some cases this type of analysis is impossible due to the lack of available techniques. For example, simultaneously including different types of relationships, different topics of discussion, different roles, properties of the people and organizations involved, as well as states of the social network at different times, may be useful when performing social network analysis but is currently impossible. In other words, to date, no single social network analysis tool can perform all of the above aspects in a single representation. A tight coupling of content and topics of discussion with social networks is currently unavailable, but may be desirable because such information can shed light on social network data. These capabilities may be particular desirable for social networks that involve communication between the participants, such as those constituted by or supported by social media. Social media include but are not limited to FACEBOOK®, TWITTER®, or GOGGLE PLUS®.

Thus, certain problems in social network analysis remain unsolved. For example, there is no approach or data visualization tool that can incorporate all of the above aspects in a single representation and provide a unified solution to the depiction of the social network. Another related problem is that current technologies are unable to represent and summarize multiple types of relationships in a temporal sequence simultaneously. For example, available tools do not provide a view of time, topics, and ranked importance of entities in the social network.

SUMMARY

The illustrative embodiments provide for a method. The method includes processing social network data using one or more processors to establish a tensor model of the social network data, the tensor model having at least an order of four. The method also includes decomposing the tensor model using the one or more processors into a plurality of principal factors. The method also includes synthesizing, using the one or more processors, and from a subset of the plurality of principal factors, a summary tensor representing a plurality of relationships among a plurality of entities in the tensor model, such that a synthesis of relationships is formed and stored in one or more non-transitory computer readable storage media. The method also includes identifying, using the one or more processors and further using one of the summary tensor and a single principal factor in the subset, at least one parameter selected from the group consisting of: a correlation among the plurality of entities, a similarity between two of the plurality of entities, and a time-based trend of changes in the synthesis of relationships. The method also includes communicating the at least one parameter.

The illustrative embodiments also provide for a system. The system includes a modeler configured to establish a tensor model of social network data, the tensor model having at least an order of four. The system also includes a decomposer configured to decompose the tensor model into a plurality of principal factors. The system also includes a synthesizer configured to synthesize, from a subset of the plurality of principal factors, a summary tensor representing a plurality of relationships among a plurality of entities in the tensor model, such that a synthesis of relationships is formed and stored in one or more non-transitory computer readable storage media. The system also includes a correlation engine configured to identify, using one of the summary tensor and a single principal factor in the subset, at least one parameter selected from the group consisting of: a correlation among the plurality of entities, a similarity between two of the plurality of entities, and a time-based trend of changes in the synthesis of relationships. The system also includes an output device configured to communicate the at least one parameter.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of examples of matrices that represent relations and properties, in accordance with an illustrative embodiment;

DETAILED DESCRIPTION

Figure 1:
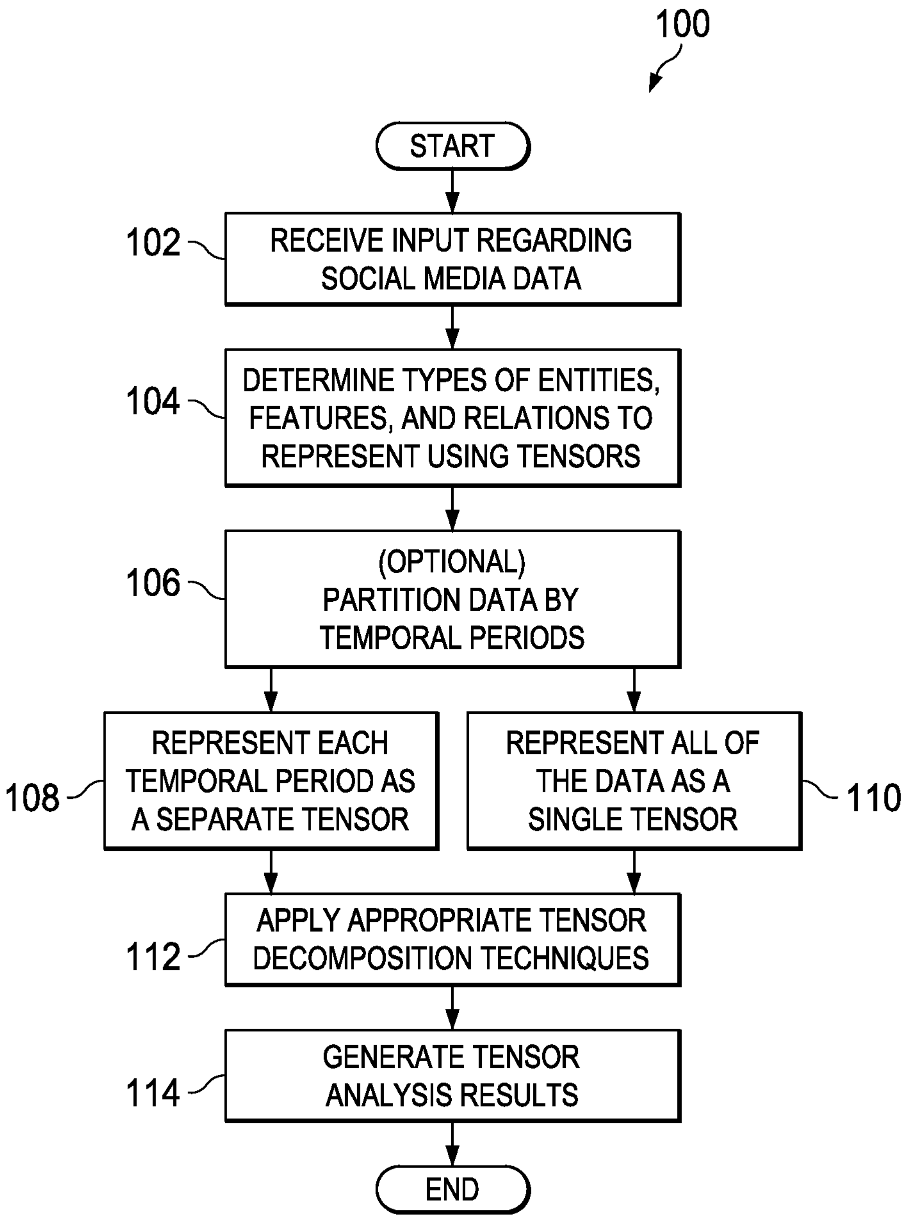
FIG. 1 is a flowchart illustrating a summary of a process for identifying latent interactions a social network, in accordance with an illustrative embodiment.

The illustrative embodiments provide several useful functions. For example, the illustrative embodiments provide for a multi-dimensional mathematical model which synthesizes multiple relationships in a social network, together with topics of discussion, to reveal hidden or latent links, correlations, and trends in social network relationships.

The illustrative embodiments also recognize and take into account that social network relationships and content in social media may be mathematically modeled using tensors. Relationships between nodes, such as people, organizations, locations, and other entities can be represented simultaneously using tensors. The illustrative embodiments provide techniques to mathematically decompose these tensors to simultaneously reveal topics, themes, and characteristics of the relationships of these entities in a temporal sequence.

The illustrative embodiments solve the previously unsolved issue of finding latent interactions in social network data. Examples of latent interactions in social network data include but are not limited to non-obvious trends or relationships in data, events, people, places, and relationship, possibly over the temporal periods. One way of finding such latent interactions proposed by this invention is finding two entities that are both highly weighted in a significant principal factor. Another way of finding such latent interactions is to compare two entities of the same type, such as two persons or two terms or topics, using one of a number of distance or similarity metrics applied to sub-tensors representing the two entities.

As used herein, the following terms have the following definitions:

"Social network information" includes information relating to a social network, such as relationships between people and other entities that play a role in social relations or interactions among people, as well as information that describes how entities in a social network are connected to words and objects. "Social network information", for example, includes information posted on social media Web sites such as FACEBOOK® and TWITTER®. "Social network information" may include information outside of a social network, such as an online social network, but in some way relates to persons or entities associated with persons.

An "entity" is an object in an abstract sense. An "entity" is not necessarily animate. Examples of entities include a person, a group of persons (distinguished from the members of the group), a social organization, a thing, a place, an event, a document, a word, an idea, or any other concept that may be identified as an abstract or concrete object.

A "document" is any unit of text for analysis, such as a TWEET® on TWITTER®, a single paragraph of a larger document, a blog, a text message, an entry in a database, a string of alphanumeric character or symbols, a whole document, a text file, a label extracted from multi-media content, or any other unit of text for analysis.

A "tensor" is a multi-dimensional array of numbers.

An "order" of a tensor is the number of dimensions, also known as ways or modes. An "order" of a tensor is the number of indices required to address or represent a single entry or number in the tensor. A one-dimensional tensor has an order of one and may be represented by a series of numbers. Thus, for example, a vector is a tensor of order one. A two-dimensional tensor has an order of two and may be represented by a two-dimensional array of numbers, which in a simplistic example may be a tic-tac-toe board. A three-dimensional tensor has an order of three and may be represented by a three-dimensional array of numbers, which may in a simple example be visualized as a large cube made up of smaller cubes, with each smaller cube representing a number entry. A simple way of visualizing an order three tensor might be to visualize a RUBIC'S CUBE®, where the tensor constitutes numbers associated with each component cube. A four-dimensional tensor has an order of four and may be represented by a four-dimensional array of numbers, which in some, but not all cases may be thought of as a series of three-dimensional tensors. Tensors may have an order greater than four. The above examples of specific orders of tensors are for example and ease of understanding only, and are not necessarily limiting on the claimed inventions. Tensors of order three or higher may be called high-order tensors.

A "cell" is the location in a tensor of a single entry or number. A cell is identified or addressed by a set of integers called indices. A third-order tensor has three indices, a fourth-order tensor has four indices, and so on.

A "sub-tensor" of a tensor is a tensor of lower order extracted from the original tensor by holding one or more indices of the first tensor constant and letting all the others vary. For example, a third-order tensor may be extracted from a tensor of order four by holding a single index constant and letting all others vary.

A "column rank" of a matrix is the maximum number of linearly independent column vectors of the matrix. A "row rank" of a matrix is the maximum number of linearly independent row vectors. A result of fundamental importance in linear algebra is that the column rank and the row rank are equal. Thus, the "rank" of the matrix is either one of the column rank or the row rank. The rank of a matrix can be computed through mathematical numerical algorithms. An example of such an algorithm is singular value decomposition (SVD) to be defined below.

The definition of tensor rank is an analogue to the definition of matrix rank. A high-order tensor is "rank one" if it can be written as an outer-product of vectors. This fact means that each entry of a rank one tensor is the product of the entries of the corresponding vector cells. The PARAFAC algorithm, defined below, decomposes a tensor as a sum of rank one tensors.

An "outer-product rank", or simply a "rank", of a tensor is defined as the smallest number of rank-one tensors that generate the tensor as their sum. A tensor has an "outer-product rank" r if it can be written as a sum of r and no fewer outer-products of vectors in the corresponding space.

A "matrix decomposition" is a factorization of a matrix into a product of matrices. Many different matrix decompositions exist; each finds use among a particular class of applications. A matrix decomposition can also be expressed as a sum of vector outer-products, as illustrated in the top row of FIG. 14 for singular value decomposition (SVD), defined below.

Figure 14:
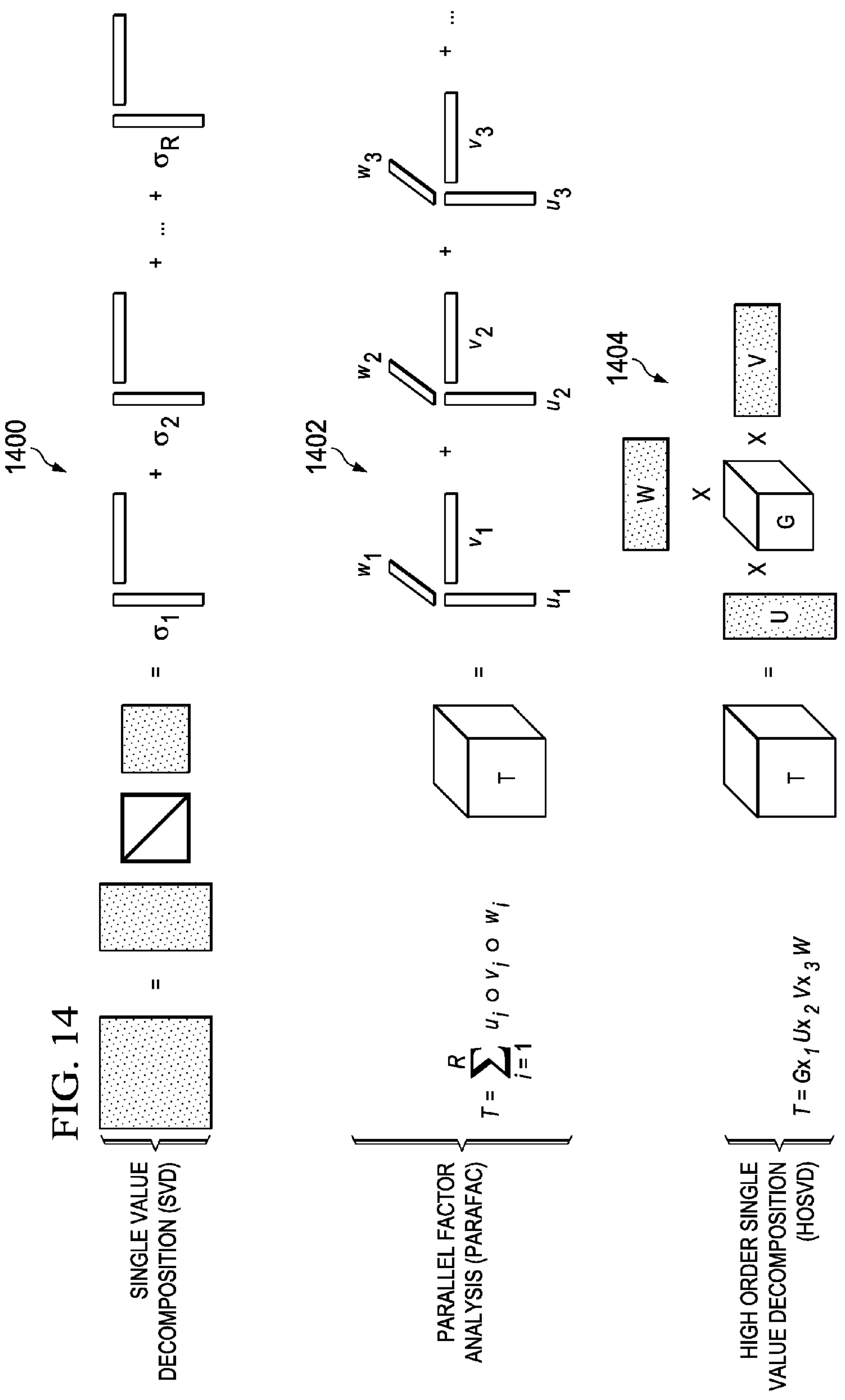
FIG. 14 is an illustration of different mathematical matrix and tensor decomposition techniques, in accordance with an illustrative embodiment.

A "Singular Value Decomposition (SVD)" refers to both a mathematical theory and a matrix decomposition algorithm that expresses an arbitrary matrix as a product of three matrices: an orthogonal matrix, a diagonal matrix, and another orthogonal matrix, as illustrated in FIG. 14. The column vectors of the first orthogonal matrix are called the left singular vectors, the column vectors of the second orthogonal matrix are right singular vectors. The non-zero entries on the diagonal of the diagonal matrix are called the singular values. With SVD, a matrix can be expressed, equivalently, as a sum of outer-product of left- and right-singular vectors and singular values. The number of singular values also determines the "outer-product rank" or simply the "rank" of a matrix.

"Principal component analysis (PCA)" is a mathematical procedure that uses a linear transformation to convert a set of observations of possibly correlated variables into a set of values of orthogonal variables called "principal components". This transformation is defined in such a way that the first principal component has the largest possible variance, and each succeeding component in turn has the highest variance possible under the constraint that it be orthogonal to the proceeding components. PCA can be implemented through a variety of algorithms, and is most commonly implemented via SVD-based algorithms. The first few principal components usually retain most of the variation in the data. This fact leads to the idea of reduction of the matrix to a matrix with fewer directions in vector space and low rank approximation methods in data analysis. PCA and low rank approximations can be interpreted mathematically as performing an orthogonal projection onto such a vector space.

"Tensor decomposition" is a factorization of a tensor into a product of matrices and tensors, or a sum of rank-one tensors, each being an outer-product of vectors. The result of a tensor decomposition can often be used to identify correlations among different factors or attributes in a high-order tensor. There are many different tensor decompositions via different algorithms. Two particular tensor decomposition can be considered to be high-order extension to the matrix SVD (singular value decomposition): the PARAFAC (Parallel Factorization) and HOSVD (Higher-Order SVD, also known as the Tucker decomposition), as illustrated in FIG. 14. The concept of PCA can be extended to high-order tensors. The PARAFAC and HOSVD tensor decompositions, as illustrated in FIG. 14, are considered to be higher-order generalizations of the matrix SVD and PCA. These tensor decompositions are often used to generate a lower rank tensor that approximates the original tensor such that the most significant information is retained and noise in the data is reduced or eliminated. The process can be interpreted mathematically as multi-linear projections onto a tensor subspace.

A "principal factor" refers to a set of vectors whose outer-product is a rank-one tensor which may result from tensor decomposition. A principal factor can be viewed as a projection of a tensor onto tensor space with only one direction that combines information from all of the dimensions of the original tensor. The projection is used to focus on information of interest.

A "summary tensor" is a tensor of lower rank that is a projection of a tensor with a higher rank. For example, a summary tensor may be constructed from one or more principal factors. A summary tensor reduces noise in the tensor of higher rank with respect to information of interest by retaining only directions in the underlying tensor space of greater importance. In some cases, a summary tensor may contain a subset of information taken from a larger tensor, but important information usually is not lost when the projection is performed. A summary tensor will have the same order as the original tensor, but with a lower rank.

FIG. 1 is a flowchart illustrating a summary of a process for identifying latent interactions in a social network, in accordance with an illustrative embodiment. The operations shown in flowchart 100 may be described as being performed by a process. The process shown in FIG. 1 may be implemented using system 200 of FIG. 2. The process shown in FIG. 1 may be implemented by a processor, such as processor unit 1504 of FIG. 15. The process shown in FIG. 1 may be a variation of the processes shown in FIG. 3 through FIG. 6. Although the operations presented in FIG. 1 are described as being performed by "a process," the operations are being performed by at least one tangible processor or using one or more physical devices, as described elsewhere herein.

The flow begins when the process receives input regarding social media data (operation 102). The process then determines the types of entities, features, and relations to represent using tensors (operation 104). Optionally, the process may partition data by temporal periods (operation 106). In this case, also optionally, the process may represent each temporal period as a separate tensor (operation 108). Alternatively, also optionally, the process may represent all of the data as a single tensor, with or without time as one of the dimensions (operation 110).

Whether the process went to operation 108 or operation 110, the process then may apply appropriate tensor decomposition techniques (operation 112). In an illustrative embodiment, a single technique may be used. Tensor decomposition techniques are more fully described elsewhere herein, including with respect to FIG. 4, FIG. 5, and FIG. 14, for example. In any case, the process may generate tensor analysis results (operation 114). These results may be used to analyze latent interactions, including but not limited to non-obvious trends or relationships in data, events, people, places, and relationships, possibly over the temporal periods. The process may terminate thereafter.

In addition to representing true relations between entities, such as family or friendship, or business or communication ties, the illustrative embodiments also allow for the representation of non-relational attributes, for example, biometric features like eye color or height, or type of organization, into the same tensor representation by recasting them as the relation of matching on that characteristic. This feature allows for better assessment of the similarity of entities, likely or potential grouping of entities, or possible hidden ties between entities.

Non-relational attributes can be categorical like eye-color or numerical like height. In the former case, one way of representing categorical attributes is binary representation. For example, if two people have the same eye color, the cell representing their intersection in the "matched eye color" relation will have a 1 and otherwise will have a 0. For numerical non-relational attributes like height, the cell representing their intersection in the "matched height" relation may have a 1 if their heights are both in the same height range or are within a certain distance of each other; otherwise, the value in the cell may be 0.

An alternative way of representing non-relational attributes is as non-binary values. In this case, if two people share a rare value for an attribute, their intersection cell will receive a higher value than if they share a common value for that attribute. For example, two people with blue eyes in a geographical region where most people have darker eyes will get a higher value for their match than two people with darker eyes. Similarly, people who are close to each other in height but share an extreme height, either tall or short, will get a higher value in the cell for their intersection in the "shared height relation" than two people who are close to each other with an average height.

The illustrative embodiments shown in FIG. 1 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 2:
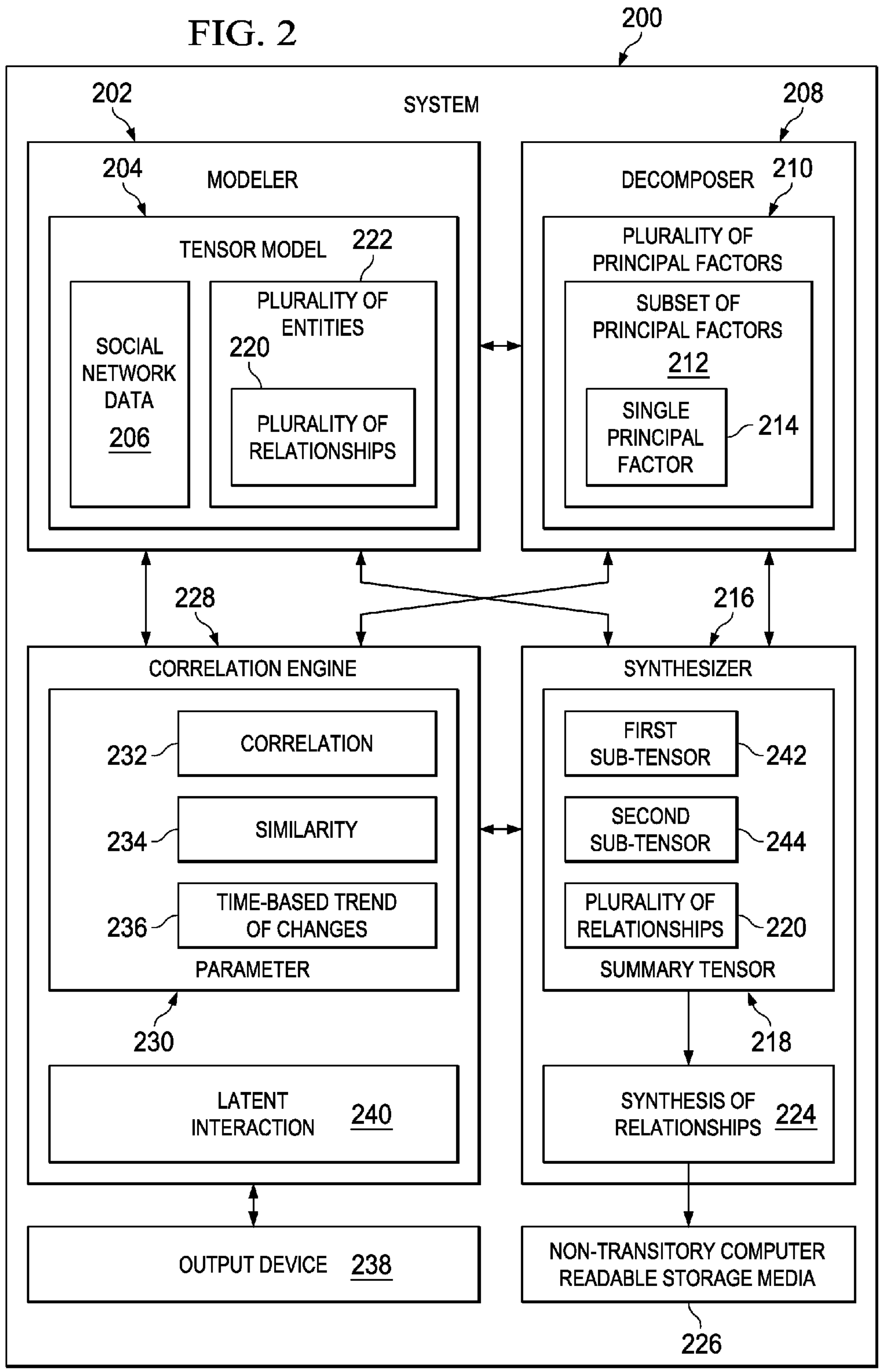
FIG. 2 is a block diagram of a system for identifying latent interactions in a social network, in accordance with an illustrative embodiment.

FIG. 2 is a block diagram of a system for identifying latent interactions a social network, in accordance with an illustrative embodiment. System 200 may be a tangible system for implementing the methods described herein, such as for example flowchart 100 of FIG. 1, flowchart 300 of FIG. 3, and other techniques described herein. System 200 may be implemented with, or embodied as, one or more processors, such as processor unit 1504 of FIG. 15.

System 200 may be used to identify latent interactions in social network data. System 200 may use modeler 202 to establish tensor model 204 of social network data 206. Tensor model 204 may be at least an order of four in some illustrative embodiments. However, tensor model 204 may have different orders in different illustrative embodiments. In an illustrative embodiment, tensor model 204 may be a four-dimensional tensor comprising a time-based sequence of three-dimensional tensors.

In an illustrative embodiment, establishing tensor model 204 may include incorporating both relationships among entities and non-relational attributes of the entities into a single tensor representation, wherein the entities are in the tensor model. For example, biometric features such as eye color or height may be correlated in a single tensor representation to the type of organization to which the persons having those characteristics belong.

In another example, without limitation, the illustrative embodiments contemplate that tensor model 204 correlates an identification phrase of a third-party social network service with topics of discussion. An example of such an identification phrase may be a TWITTER HASHTAG® on the TWITTER® social network service. Known social network analysis techniques do not blend content analysis and relationships in the social network in this manner. Thus, in a non-limiting example, the determined parameter discussed below may consist of the correlation among the plurality of entities, wherein the plurality of entities comprises an identification phrase of a third-party social network service and a topic of discussion.

System 200 may also include decomposer 208 in communication with modeler 202. In an illustrative embodiment, decomposer 208 may be implemented using the same processor that implements modeler 202. Decomposer 208 may be configured to decompose tensor model 204 into plurality of principal factors 210. In other illustrative embodiments, decomposer 208 may be configured to decompose tensor model 204 into a single principal factor. Plurality of principal factors 210 may include subset of principal factors 212. Subset of principal factors 212 contains fewer principal factors than plurality of principal factors 210. Subset of principal factors 212 could be single principal factor 214.

System 200 may also include synthesizer 216 in communication with decomposer 208. Synthesizer 216 may be the same functional entity as modeler 202 in some illustrative embodiments. Synthesizer 216 may be configured to synthesize, from subset of principal factors 212, summary tensor 218. Summary tensor 218 may represent plurality of relationships 220 among plurality of entities 222 in tensor model 204. In this manner, a synthesis of relationships 224 is formed and stored in one or more non-transitory computer readable storage media 226.

System 200 may also include correlation engine 228. Correlation engine 228 may be configured to identify, using one of summary tensor 218 and single principal factor 214, at least one of parameter 230 that is selected from the group consisting of: correlation 232 among plurality of entities 222, similarity 234 between two of plurality of entities 222, and time-based trend of changes 236 in synthesis of relationships 224. Time-based trend of changes 236 may be modeled by overlapping time windows of tensor model 204 to approximate sequencing in tensor model 204, as described further with respect to FIG. 7 and FIG. 8. Other parameters may also be the product of analysis engine 224.

System 200 may also include output device 238. Output device 238 may be configured to communicate parameter 230. Communicating parameter 230 may include communication of parameter 230 to some other device or software application, display of parameter 230 on a display, storing of parameter 230 in non-transitory computer readable storage media 226, and other transmission of parameter 230. Other forms of communication exist. In an illustrative embodiment, modeler 202, decomposer 208, synthesizer 216, correlation engine 228, and output device 238 are all embodied as a computer system, and possibly as a single computer system.

In an illustrative embodiment, decomposer 208 may have other functions. For example, decomposer 208 may be configured to receive a specification of a first entity modeled in tensor model 204. In this case, decomposer 208 may be configured to select single principal factor 214 that assigns a large weight to the first entity. As used herein the term "large weight" means a weight in a specified number of weights assigned to entities in single principal factor 214 or a weight in single principal factor 214 that is larger than a predetermined threshold.

Decomposer 208 may also be configured to identify a second entity modeled in the tensor model that is related to the first entity. Identifying the second entity may be based on the second entity being assigned a second weight in single principal factor 214, wherein the second weight is large. In other words, decomposer 208 may rank the second entity within a specified number of the largest entities in single principal factor 214, or decomposer 208 may assign the second entity a weight larger than a predetermined threshold. The second entity may be of the same type as the first entity or it may be of a different type. For example, the first entity may be a person and the second entity may be a person or may be a topic or a time period.

In an illustrative embodiment, plurality of relationships 220 may include a relationship between a document and a word, phrase, or string. The word, phrase, or string may be an identification phrase of a third party social network service, such as for example a TWITTER HASHTAG®.

In an illustrative embodiment, parameter 230 may consist of a similarity between two of plurality of entities 222. In this case, correlation engine 228 may be further configured to identify latent interaction 240 in social network data 206. Examples of latent interaction 240 in social network data 206 include but are not limited to non-obvious trends or relationships in data, events, people, places, and relationship, possibly over the temporal periods.

Correlation engine 228 may perform this identification by comparing first sub-tensor 242 of summary tensor 218 to second sub-tensor 244 of summary tensor 218. First sub-tensor 242 may represent one of a first entity or a first complex entity. Second sub-tensor 244 may represent one of a second entity or a second complex entity. A "complex entity" may be, in a non-limiting example, an entity in plurality of entities 222 at a particular time period, represented by an N−2 dimensional sub-tensor of the original tensor model, as opposed to just an entity or just a time period, which is represented by an N−1 dimensional sub-tensor of the original tensor model. In this case, "N" is the dimensionality of both the original tensor (tensor model 204) and the corresponding summary tensor (summary tensor 218). Summary tensor 218 and tensor model 204 may have a same tensor order. In an illustrative embodiment, comparing may use one of a distance metric or a similarity metric, or both. Other comparing techniques may be used.

System 200 of FIG. 2 may be embodied as a computer system. The computer system may include a processor and a bus in communication with the processor. The data processing system may further include a memory in communication with the bus, the memory comprising a non-transitory computer readable storage medium storing program code executable by the processor. The program code may be configured to perform the functions described above.

The illustrative embodiments shown in FIG. 2 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 3:
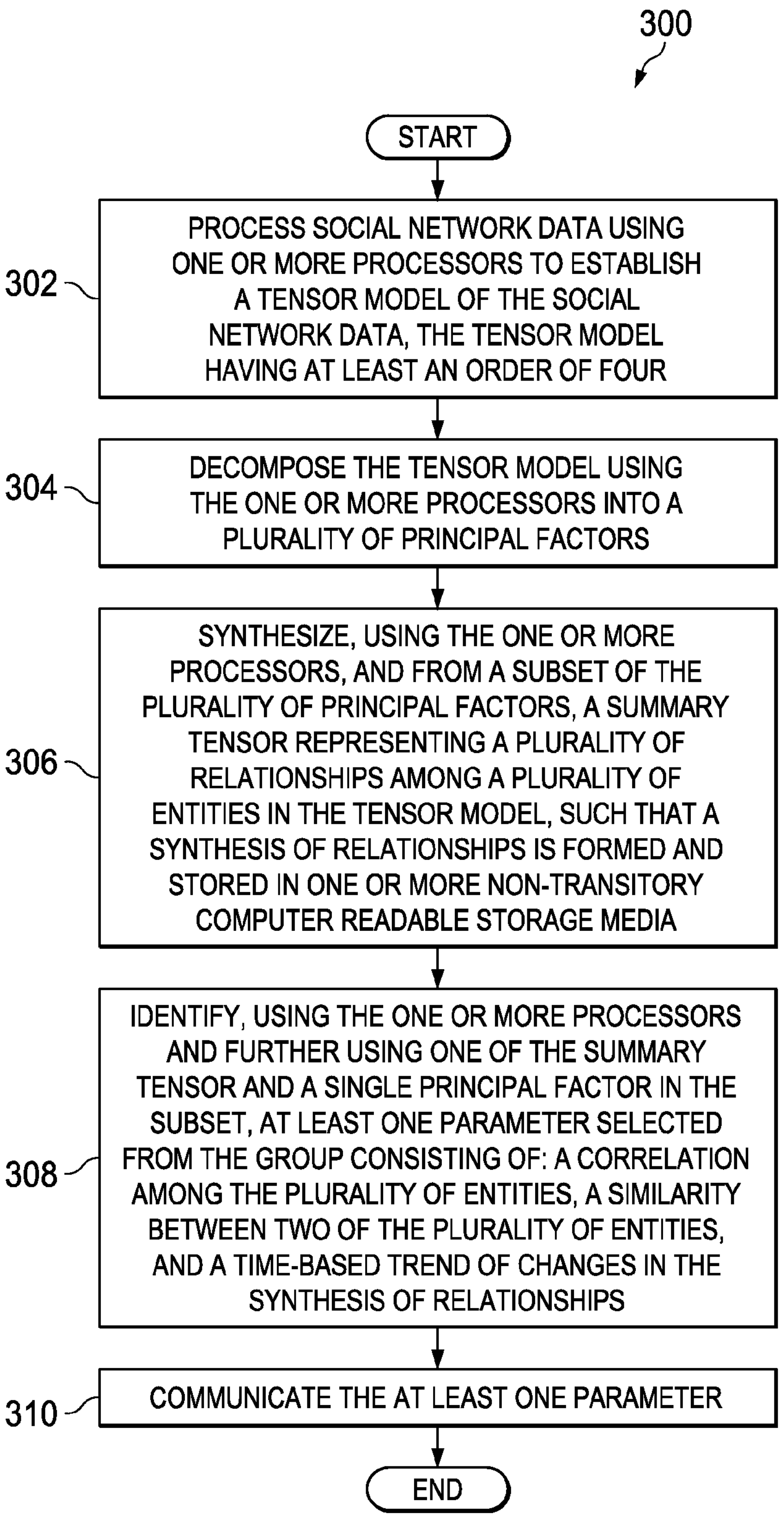
FIG. 3 is a flowchart illustrating a process for identifying latent interactions in a social network, in accordance with an illustrative embodiment.

FIG. 3 is a flowchart illustrating a process for identifying latent interactions in a social network, in accordance with an illustrative embodiment. The operations shown in flowchart 300 may be described as being performed by a process. The process shown in FIG. 3 may be implemented using system 200 of FIG. 2. The process shown in FIG. 3 may be implemented by a processor, such as processor unit 1504 of FIG. 15. The process shown in FIG. 3 may be a variation of the processes shown in FIG. 1, FIG. 2, and FIG. 4 through FIG. 6. Although the operations presented in FIG. 3 are described as being performed by "a process," the operations are being performed by at least one tangible processor or using one or more physical devices, as described elsewhere herein.

In an illustrative embodiment, flowchart 300 may begin when the process processes social network data using one or more processors to establish a tensor model of the social network data, the tensor model having at least an order of four (operation 302). The process may then decompose the tensor model using the one or more processors into a plurality of principal factors (operation 304). The process may then synthesize, using the one or more processors, and from a subset of the plurality of principal factors, a summary tensor representing a plurality of relationships among a plurality of entities in the tensor model, such that a synthesis of relationships is formed and stored in one or more non-transitory computer readable storage media (operation 306).

The process may then identify, using the one or more processors and further using one of the summary tensor and a single principal factor in the subset, at least one parameter selected from the group consisting of: a correlation among the plurality of entities, a similarity between two of the plurality of entities, and a time-based trend of changes in the synthesis of relationships (operation 308). The process may then communicate the at least one parameter (operation 310).

The process may terminate thereafter in some illustrative embodiments. In other illustrative embodiments, the process may be varied or expanded. For example, a relationship in the plurality of relationships may be established by a commonality among two entities represented in the tensor model.

In an illustrative embodiment, the plurality of relationships may include a relationship between a first person and a second person. In another illustrative embodiment, the plurality of relationships may include a relationship between a person or an organization and a non-person object or event. In yet another illustrative embodiment, the plurality of relationships include a relationship between a document and a word, phrase, or string. In still another illustrative embodiment, the word, phrase, or string comprises an identification phrase of a third party social network service.

In an example where the method described in FIG. 3 may be expanded, the parameter may consist of the correlation among the plurality of entities. In this case, identifying further includes receiving a specification of a first entity modeled in the tensor model. Identifying also further includes selecting the single principal factor. The single principal factor assigns a first weight to the first entity. The first weight is large. Large comprises one weight in a specified number of weights assigned to entities in the single principal factor or a weight in the single principal factor that is larger than a predetermined threshold. Finally, identifying may further include identifying a second entity modeled in the tensor model that is related to the first entity. Identifying the second entity may be based on the second entity being assigned a second weight in the single principal factor. The second weight may be large.

The process of identifying may be further varied yet. For example, the parameter may consist of the similarity between two of the plurality of entities. In this case, identifying may further include comparing a first sub-tensor of the summary tensor, representing one of a first entity or a first complex entity, to a second sub-tensor of the summary tensor, representing one of a second entity or a second complex entity, wherein comparing uses one of a distance metric or a similarity metric.

In this example, the first sub-tensor may be a first N−1 sub-tensor relative to the summary tensor and the second sub-tensor may be a second N−1 sub-tensor relative to the summary tensor. "N" may be a dimensionality of the tensor model. The first sub-tensor and the second sub-tensor have a same tensor order.

The method described with respect to FIG. 3 may be varied further still. For example, the method may further include modeling, based on the at least one parameter, a content of the social network. In this case, modeling may include, based on the at least one parameter, a change in the content.

In an illustrative embodiment, the tensor model may be a four-dimensional tensor comprising a time-based sequence of three-dimensional tensors. In an illustrative embodiment, the at least one parameter may be the time-based trend of changes. In this case, the time-based trend of changes may be modeled by overlapping time windows of the tensor model to approximate sequencing in the tensor model.

In an illustrative embodiment, establishing the tensor model may include incorporating relationships among entities, non-relational attributes of the entities into a single tensor representation, or both, wherein the entities are in the tensor model. In still another illustrative embodiment, the at least one parameter may consist of the correlation among the plurality of entities. In this case, the plurality of entities may consist of an identification phrase of a third-party social network service and a topic of discussion.

Flowchart 300 described with respect to FIG. 3 may be varied further still relative to the variations described above. Thus, the illustrative embodiments shown in FIG. 3 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 4:
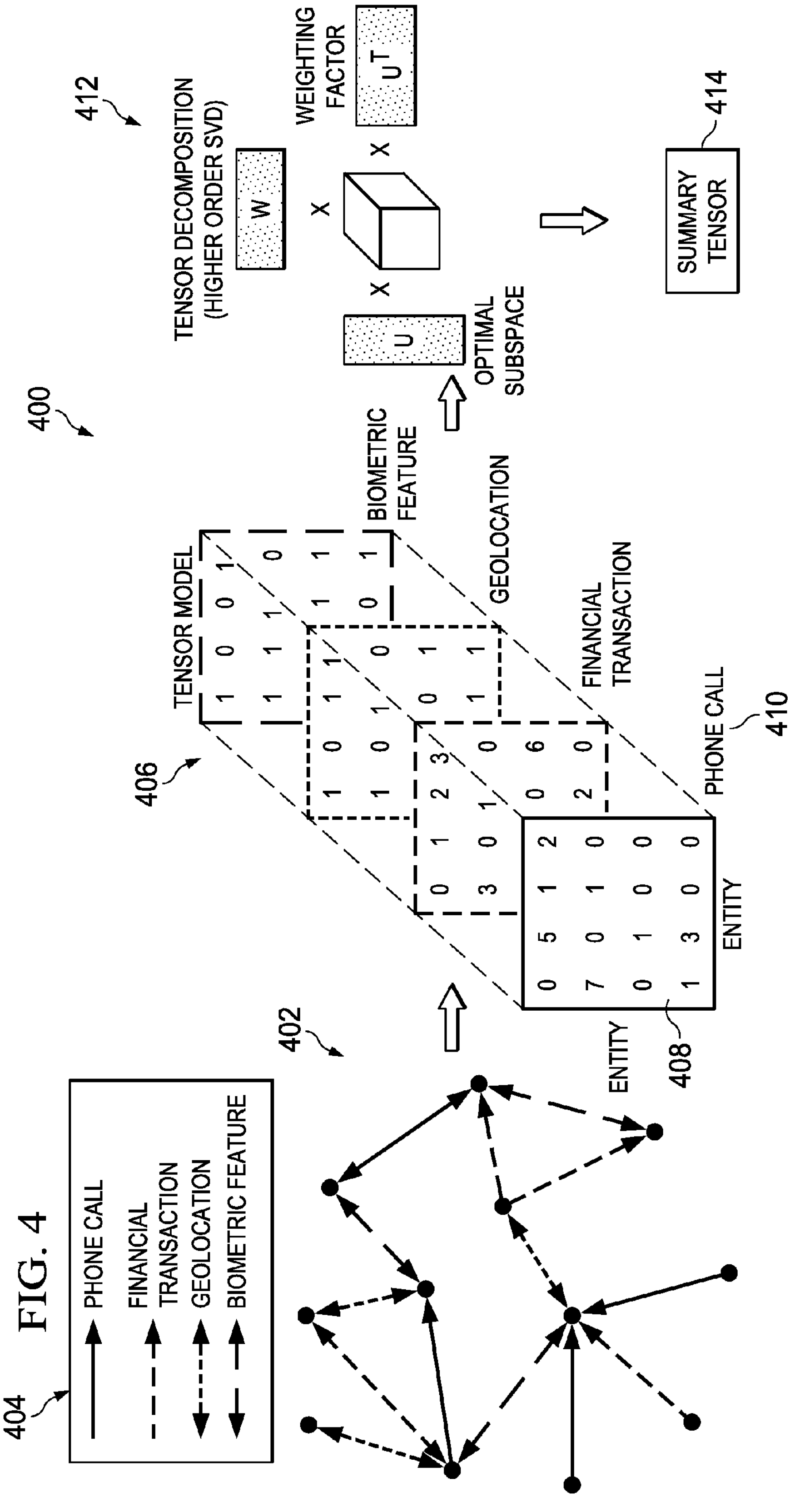
FIG. 4 is a block diagram of a process for identifying latent interactions in a multi-source heterogeneous social network, in accordance with an illustrative embodiment.

FIG. 4 is a block diagram of a process for identifying latent interactions in a multi-source heterogeneous social network, in accordance with an illustrative embodiment. The process shown in FIG. 4 may be implemented using system 200 of FIG. 2. The process shown in FIG. 4 may be implemented by a processor, such as processor unit 1504 of FIG. 15. The process shown in FIG. 4 may be a variation of the processes shown in FIG. 1, FIG. 3, FIG. 5, and FIG. 6. Although the operations presented in FIG. 4 are described as being performed by "a process," the operations are being performed by at least one tangible processor or using one or more physical devices, as described elsewhere herein.

Broadly speaking, flow 400 illustrates a process for characterizing entities in a social network by using tensor representation and decomposition of heterogeneous data. Flow 400 begins with receiving data 402. Data 402 may be from a multi-source heterogeneous social network, represented abstractly by the dots and arrows shown in FIG. 4. Arrows represent relationships and dots represent entities. Both arrows and dots represent different types of data within data 402. Legend 404 may indicate the types of relationships in one possible multi-source heterogeneous social network, though many other types of relationships are possible and data 402 is only exemplary.

After receiving data 402, the process may transform or represent data 402 as tensor model 406. Each two-dimensional array may represent an entity by entity comparison for a particular type of relationship. Individual cell entries may represent different facts about the two entities. For example, the number "7" 408 in "phone call" array 410 may represent that a first entity and a second entity are associated with 7 phone calls. However, this number may represent other aspects of the relationship, such as for example a weighting of an importance of the phone call rather than a number of phone calls. Thus, the illustrative embodiments are not limited to this example or what is precisely displayed in FIG. 4. The specific numbers and types of entities shown in FIG. 4, in particular, are for illustrative purposes only and are not necessarily limiting of the claimed inventions.

After transforming or representing data 402 as tensor model 406, the process may use one or more mathematical techniques to decompose tensor model 406. In the illustrative embodiment of FIG. 4, higher-order singular value decomposition (HOSVD) 412 technique may be used. The result of this decomposition may be summary tensor 414. Summary tensor 414 may then be used to find latent interactions including but not limited to hidden trends, relationships, or associations within data 402. These hidden trends, relationships, or associations may be one or more parameters identified by the process shown in FIG. 4. Other parameters are possible.

Figure 5:
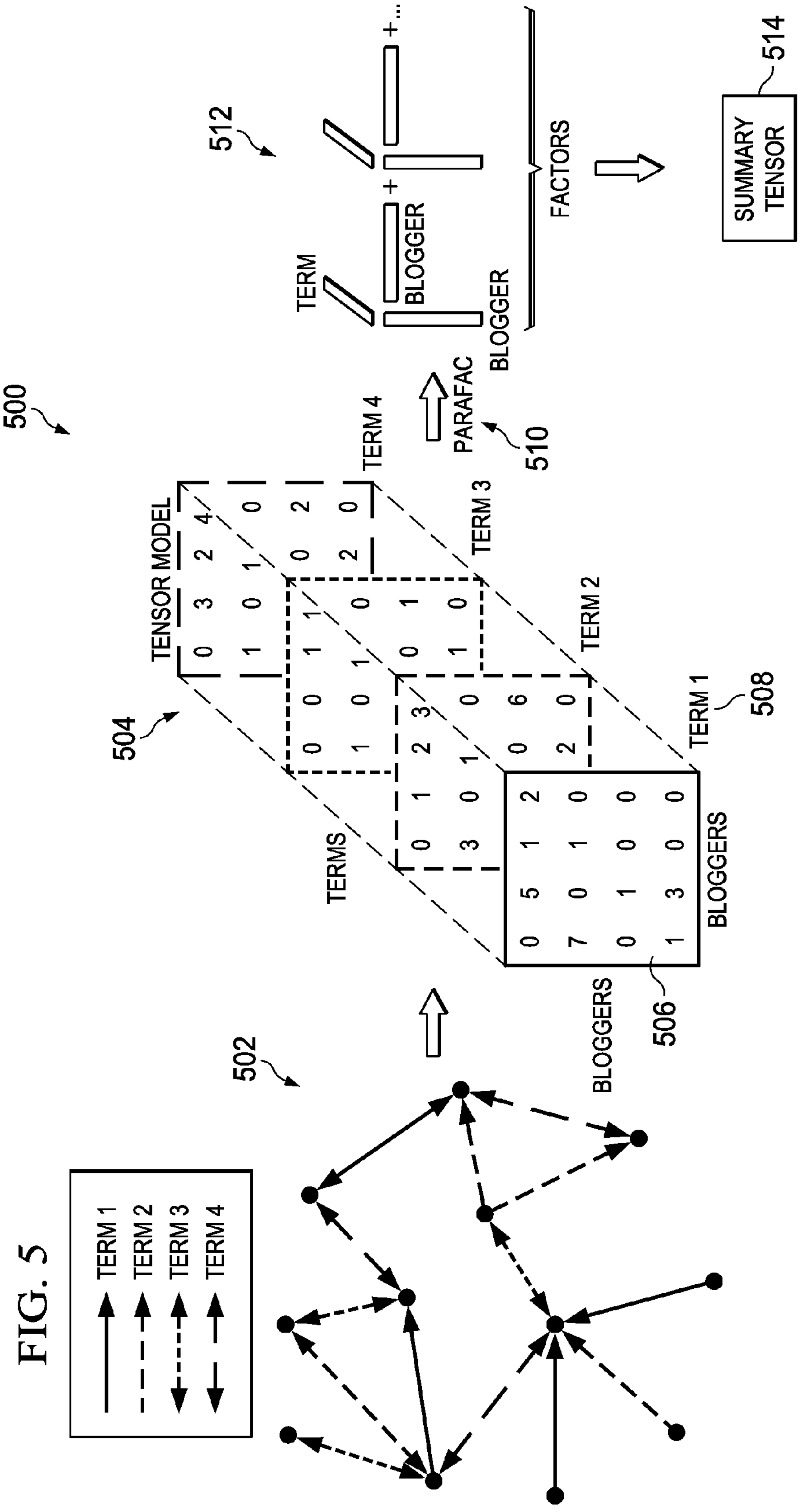
FIG. 5 is a block diagram of a process for identifying latent interactions in a multi-source heterogeneous social network, in accordance with an illustrative embodiment.

FIG. 5 is a block diagram of a process for identifying latent interactions in a multi-source heterogeneous social network, in accordance with an illustrative embodiment. The process shown in FIG. 5 may be implemented using system 200 of FIG. 2. The process shown in FIG. 5 may be implemented by a processor, such as processor unit 1504 of FIG. 15. The process shown in FIG. 5 may be a variation of the processes shown in FIG. 1, FIG. 3, FIG. 4, and FIG. 6. Although the operations presented in FIG. 5 are described as being performed by "a process," the operations are being performed by at least one tangible processor or using one or more physical devices, as described elsewhere herein.

Flow 500 of FIG. 5 shares common characteristics with flow 400 of FIG. 4, but is presented to illustrate another use for the techniques described herein. Again, data 502 represents multi-source heterogeneous social network data, though from sources different than those presented in data 400 of FIG. 4. In FIG. 5, dots in data 502 represent individual bloggers, whereas arrows represent communications among the bloggers, where the arrows are labeled by the terms of the communications. Thus, in this case, the bloggers are "entities" and the topics of conversation are the types of "relationship" among the entities.

After receiving data 502, the process may transform or represent data 502 as tensor model 504. Tensor model 504 may provide a layer for each term or terms, with each layer representing how often one blogger communicates to another blogger using the term which that layer represents. For example, the number "7" 506 in "term 1" array 508 may represent that a first blogger addresses 7 posts to a second blogger that contain "term 1" array 508. "Term 1" array 508 could be, for example, the verb representing a certain action or move in a football game or the name of a player, but could be any term. Number "7" 506 may represent other aspects of the relationship, such as, instead, a weighting of an importance of the term. Thus, the illustrative embodiments are not limited to this example or what is precisely displayed in FIG. 5.

After transforming or representing data 502 as tensor model 504, the process may use one or more mathematical techniques to decompose tensor model 504. In the illustrative embodiment of FIG. 5, parallel factor analysis (PARAFAC) 510 technique may be used or some other tensor decomposition may be used. Principal factors 512 are derived using PARAFAC 510. The result of this decomposition may be summary tensor 514. Summary tensor 514 may then be used to find latent interactions including but not limited to hidden trends, relationships, or associations within data 502. These hidden trends, relationships, or associations may be one or more parameters identified by the process shown in FIG. 4. Other parameters are possible.

Figure 6:
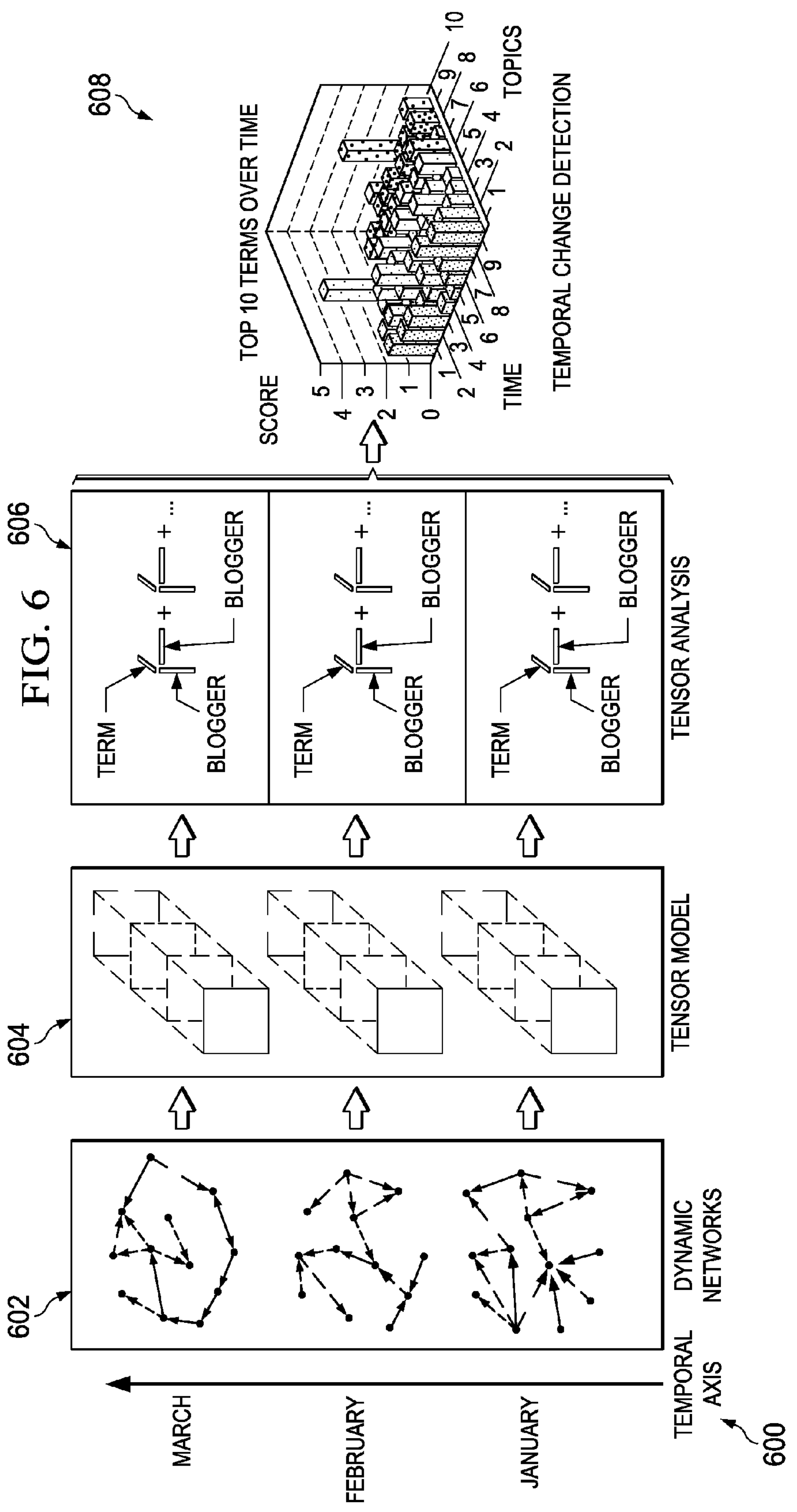
FIG. 6 is a block diagram of a process for identifying latent interactions in a multi-source heterogeneous social network to detect temporal changes in social network data, in accordance with an illustrative embodiment.

FIG. 6 is a block diagram of a process for identifying latent interactions in a multi-source heterogeneous social network to detect temporal changes in the social network data, in accordance with an illustrative embodiment. The process shown in FIG. 6 may be implemented using system 200 of FIG. 2. The process shown in FIG. 6 may be implemented by a processor, such as processor unit 1504 of FIG. 15. The process shown in FIG. 6 may be a variation of the processes shown in FIG. 1, FIG. 3, FIG. 4, and FIG. 5. Although the operations presented in FIG. 6 are described as being performed by "a process," the operations are being performed by at least one tangible processor or using one or more physical devices, as described elsewhere herein.

In summary, in some illustrative embodiments, tensor model 604 may be constructed by a sequence of tensors representing underlying dynamic social networks 602 at each time instance along temporal axis 600. In this example, tensor decompositions, performed during tensor analysis 606, may be performed on each tensor in the sequence. Changes in data in dynamic social networks 602 may be analyzed by comparing the results of each sequential tensor decomposition over time. However, this example is not limiting of the illustrative embodiments for the reasons given below.

In particular, FIG. 6 may represent an extension of the process shown in FIG. 5 to a four-dimensional tensor, with the fourth dimension reflecting time. Time is represented by temporal axis 600, in this example expressed in units of months. Instead of one set of data, such as data 502 of FIG. 5, one set of data representing a state of one or more, possibly different, social networks is provided for each time interval. Thus, in dynamic social networks 602, three sets of data are shown, one per month time interval. These three sets of data may reflect the same social networks, different social networks, or possibly some nodes and relationships that are common to some social networks at multiple times, but having additional new social networks and relationships.

As indicated above, data may be from different networks. Data from different sources, including different social media like FACEBOOK® and TWITTER®, could be represented in a tensor. However, in most cases one network is represented at different points in time in order to represent the relationships among the same individuals. Theoretically, individuals may be on multiple networks; thus, a given tensor could possibly represent complex relationships among the same set of people among multiple networks.

Although, mathematically, the same set of individuals may be involved at each point in time, the relationship between any particular pair may be null at any given time. If an individual has only zeros in all the cells representing relationships with other individuals during a given time period, the individual is, effectively, not part of the network at that time period. In this sense, by adding or subtracting non-zero values to these cells over time, an order four tensor can represent the growth or shrinkage of a network over time.

In different illustrative embodiments, a distinction of FIG. 6 relative to FIG. 5 is that tensor model 604 may be expressed as a single fourth-order tensor rather than a series of third-order tensors, like tensor model 504 in FIG. 5. While tensor model 604 is represented as a series of third-order tensors in FIG. 6, and in some cases may be mathematically treated as such, tensor model 604 may be a fourth-order tensor. Depending upon the mathematical technique used, a fourth-order tensor might not be treated the same as a series of third-order tensors. For this reason, mathematically, a fourth-order tensor cannot be treated, necessarily, the same as a set or sequence of third-order tensors.

Accordingly, tensor analysis 606, which possibly may be tensor decomposition using principal component factor analysis, need not necessarily be simply a series of PARAFAC analysis on individual three-dimensional tensors for each time period, as shown in FIG. 6. Applying a tensor decomposition to a fourth-order tensor would produce different results than applying it to each of a set of third-order tensors. The first would capture correlations across the set while the latter would not. However, in some cases, tensor analysis 606 may be treated in this manner.

Whatever mathematical technique is used, temporal change graph 608 may be produced as a result of tensor analysis 606. Temporal change graph 608 may show a score on a three-dimensional grid versus time and topics. Thus, for example, at a particular time, a particular topic may have a higher or a lower score. The score represents the intensity or importance of the discussion of the topic in a blog, which may reflect in part the relative frequency with which the topic was discussed, but also incorporates the effect of other correlated parameters.

In any case, a latent interaction may be tracked, such as tracking a trend in a change in the score over time for a particular topic or blogger. This information may allow an analyst, for example, to make future predictions regarding the topic of interest, to assess and recommend law enforcement, business, or military actions as appropriate, to draw conclusions regarding individuals discussing the topics, or to come to whatever conclusion the user considers helpful.

Figure 7:
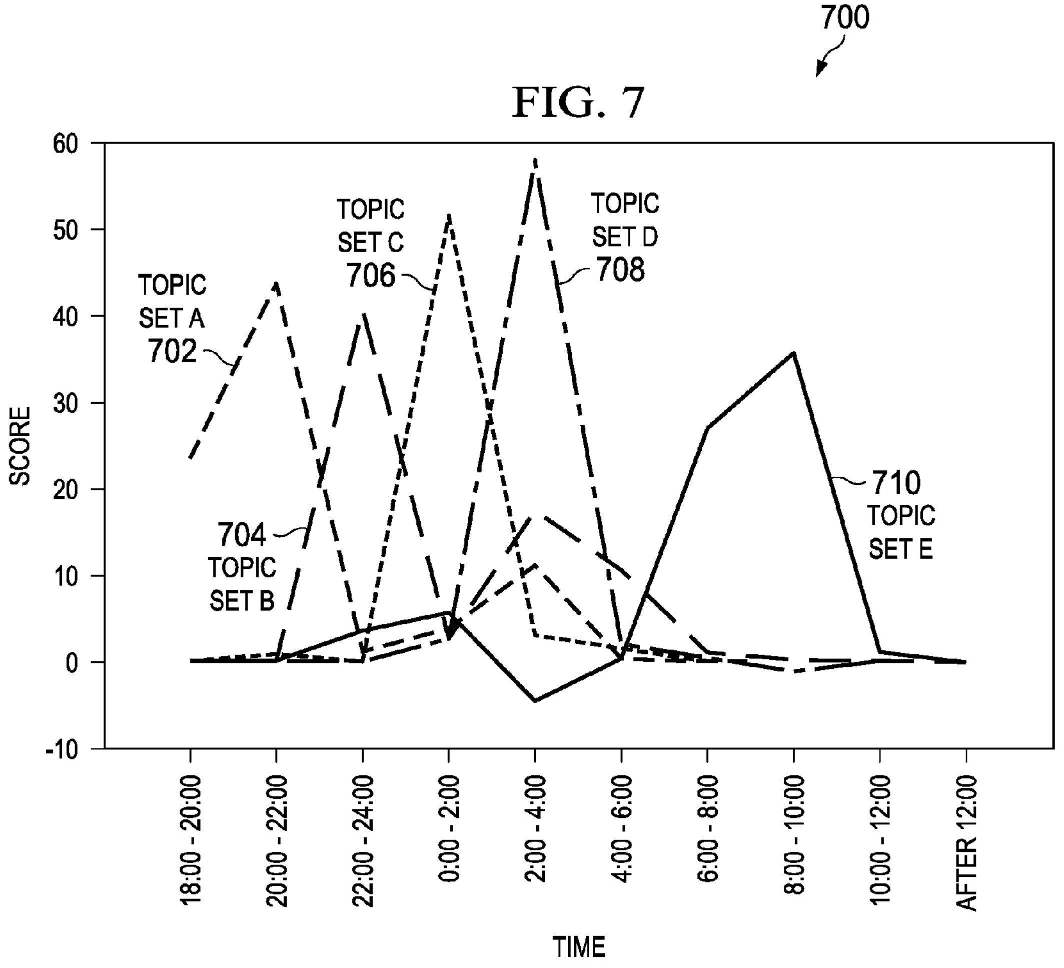
FIG. 7 is a graph of results that may be output as a result of the social network analysis techniques described herein, in accordance with an illustrative embodiment.

FIG. 7 is a graph of results that may be output as a result of the social network analysis techniques described herein, in accordance with an illustrative embodiment. FIG. 7 represents one kind of output that may be obtained from the tensor decomposition analysis techniques described herein; specifically, topics over time. Specifically, FIG. 7 shows a trend over time in topics of discussion among entities in a social network, as displayed accordingly in model 700. Specifically, topics of discussion may change over time, and that change may be tracked in model 700. FIG. 7 also illustrates how tensor analysis can be used to generate topic trends over time.

FIG. 7 shows a number of sets of topics, set of topic set A 702, topic set B 704, topic set C 706, topic set D 708, and topic set E 710. Each set of topics reflects related topics that are to be tracked. FIG. 7 shows a score, reflecting importance according to number of discussions or importance of discussions or some other parameter, and the time of day the sets of topics were discussed on a particular day.

In an illustrative embodiment, the time-based trend of changes may be modeled by overlapping time windows of the tensor model to approximate sequencing in the tensor model. When the data is partitioned into separate time periods, the time periods may overlap so that data from the end of one period is included in the next time period. (The terms "time period" and "time window" are synonymous as used herein.) This technique of overlapping time periods has the effect of eliminating sharp boundaries between the time periods, as well as tying the different time periods together into a kind of sequence. Without this technique, the time periods may be unrelated and unordered, like any other category in the tensor model.

Figure 8:
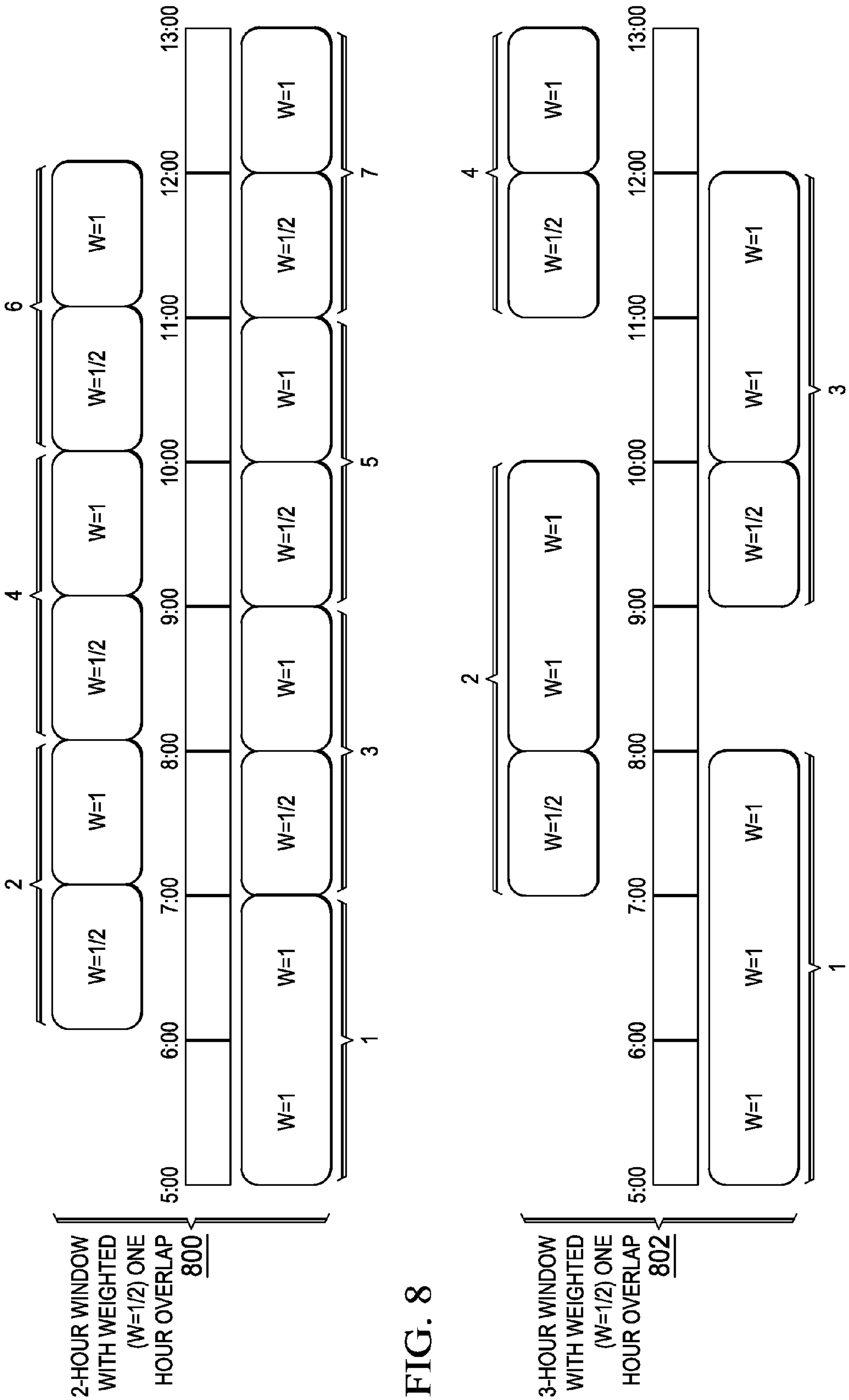
FIG. 8 is an illustration of weighted time overlap, in accordance with an illustrative embodiment.

However, overlapping time periods may be weighted, as illustrated in FIG. 8. An example of weighting may be to allow the portion of the data from the end of one period that is included in the next period be down weighted relative to the rest of the data from the next period. In this manner, the weighting results in primarily representing that latter period.

Traditionally, known latent semantic analysis techniques face challenges in temporal analysis. For example, a time window may be chosen and features only reflect one time window. Furthermore, when using known latent semantic analysis, interesting features spanning multiple time windows can be lost. Furthermore, in traditional analysis, while temporal periods form a "sequence", mathematically, each time window in the tensor model is independent, with no connection between time windows.

The illustrative embodiments use weighted overlapping time windows to address these problems. Use of weighted overlapping time windows is described in more detail with respect to FIG. 8.

FIG. 7 is presented for example only. Many different outputs may result, and the type of output may also be changed. For example, persons of interest over time may be tracked. More or less information may be presented in model 700. Thus, the illustrative embodiments shown in FIG. 7 are not necessarily limiting of the claimed inventions.

FIG. 8 is an illustration of weighted time overlap, in accordance with an illustrative embodiment. The utility of the technique described with respect to FIG. 8 is mentioned above in the description of model 700 of FIG. 7. Weighted time overlap effectively overcomes both of the above challenges mentioned above; namely, features may reflect multiple time windows and interesting features spanning multiple time windows are not lost. FIG. 8 represents how time may be input into a tensor as part of tensor analysis described elsewhere herein.

Two different weighted time overlaps are shown in FIG. 8, though many different possible variations are possible. Further, time overlap may be performed without using weighting in some illustrative embodiments. However, for purposes of example only, FIG. 8 shows two different time windows, time window 800 and time window 802. One or the other could be used to assist with producing any given output, such as that shown in FIG. 7.

Time window 800 shows a two hour time window, with an overlap of one hour and a 0.5 weight factor. In considering this time window, let "Hour A" be any particular hour time period shown on the timeline in time window 800. The entities or topics (features) in the hour before Hour A (that is Hour (A−1)) are down weighted by a factor of 0.5. The features in Hour A are set to those of Hour A, or receive full weight. With the overlapping time window, information from the hour before is no longer arbitrarily disregarded, thereby overcoming limitations in known techniques. Furthermore, each time period is now linked with the previous time period by incorporating information from it, thereby ensuring that interesting features spanning multiple time windows are not lost.

The actual time window and weighting may be determined for each application. Thus, for example, time window 802 shows a three-hour window with a one hour overlap. The features in Hour A−2 are down weighted by a factor of 0.5 and the features in Hour A and Hour A−1 receive full weight.

Many other variations are possible. Different weightings are possible than those shown. Multiple weightings may be used in each time window. For example, in time window 800 the weighting in Hour A could be 0.9 and the weighting in hour A−1 could be 0.4. Longer or shorter time windows are possible, with different overlaps. Time may be expressed in other units other than hours, such as shorter times (seconds or minutes for example) or longer times (days, weeks, months, or years for example). Thus, the illustrative embodiments shown in FIG. 8 do not necessarily limit the claimed inventions.

Figure 9:
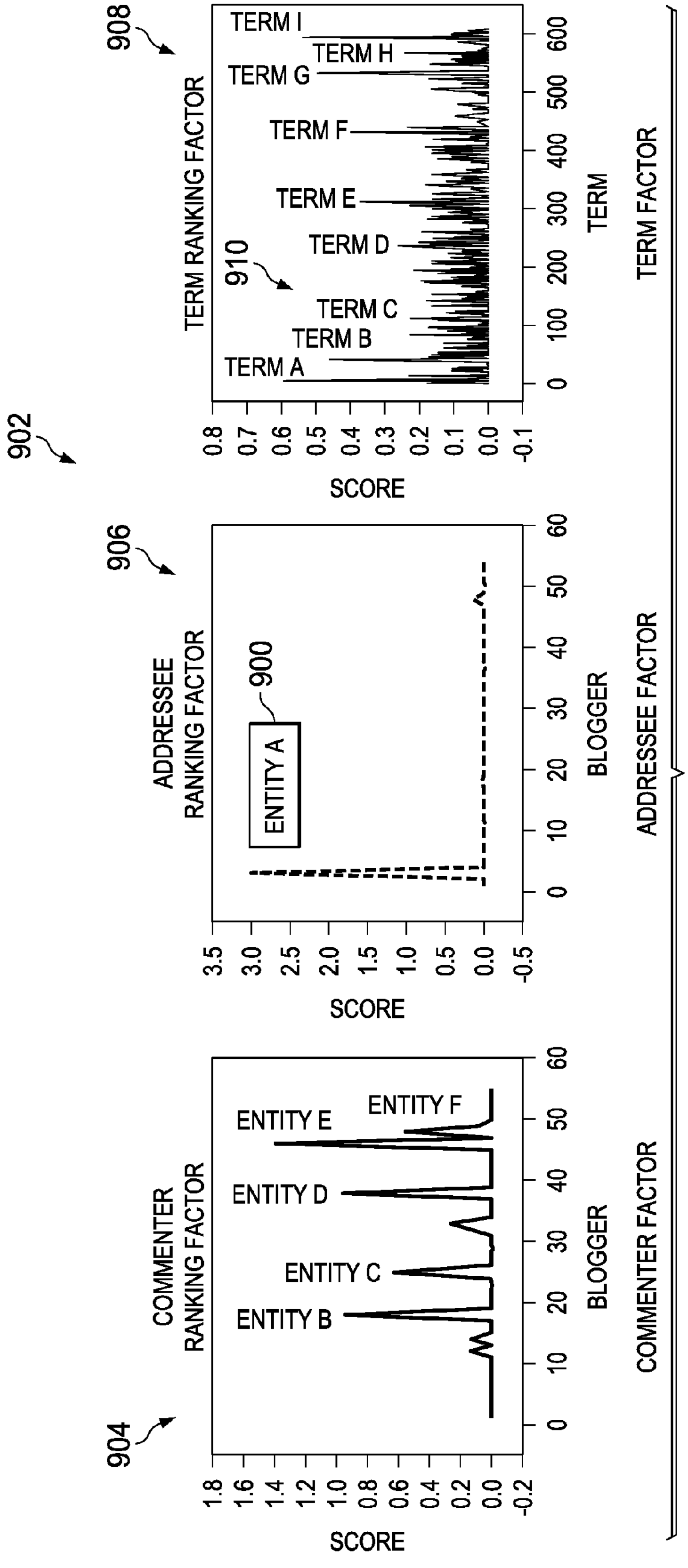
FIG. 9 is an illustration of information found regarding a particular entity using a tensor analysis of a social network, in accordance with an illustrative embodiment.

FIG. 9 is an illustration of information found regarding a particular entity using a tensor analysis of a social network, in accordance with an illustrative embodiment. FIG. 9 represents an output or result that may be derived by using the techniques described herein.

In an illustrative embodiment, FIG. 9 shows several different results of tensor analysis performed pursuant to the information discovered as part of initially analyzing data and displaying information. Model 902 may be one or more of: part of operation 112 of FIG. 1, correlation 232 of parameter 230 of FIG. 2, part of operation 310 of FIG. 3, information gained from summary tensor 414 of FIG. 4, information gained from summary tensor 514 of FIG. 5, or information gained from tensor model 604 of FIG. 6.

Model 902 shows three different graphs, graph 904, graph 906, and graph 908. Graph 904 shows a commenter factor that indicates a score associated with various entities. Graph 906 shows an addressee factor that indicates a score associated with an entity. Graph 908 shows a term factor that indicates a score associated with a particular term associated with posts or blogs related to Entity A 900. More or fewer graphs may be present. Model 902 may be presented in formats other than graphs, as shown.

Model 902 may be a result of performing a three-way commenter-addressee-term tensor factorization using PARAFAC. In a public blog or comment forum, people (commenters) may post comments and sometimes directly address their comments to other people posting (addressees). Model 902 shows that Entity A 900 may be associated with unusual term usage, with terms of interest shown in Graph 908. In this illustrative embodiment, model 902 may show the radical behavior of Entity A 900 and connection of Entity A 900 to an organization of interest 910, such as for example a terrorist organization.

An analyst may use the information shown in model 902 to take certain actions. For example, the analyst may report the findings shown by model 902 to proper authorities for further investigation of Entity A 900. However, if model 902 reflected discussion in a scientific field, then perhaps model 902 may show that further investigation in a particular scientific enquiry may be of interest. Still differently, if model 902 reflected discussion about a product, the analyst may report that certain marketing actions may be recommended to increase sales of the product. Thus, the illustrative embodiments are not limited to the examples described above.

Figure 10:
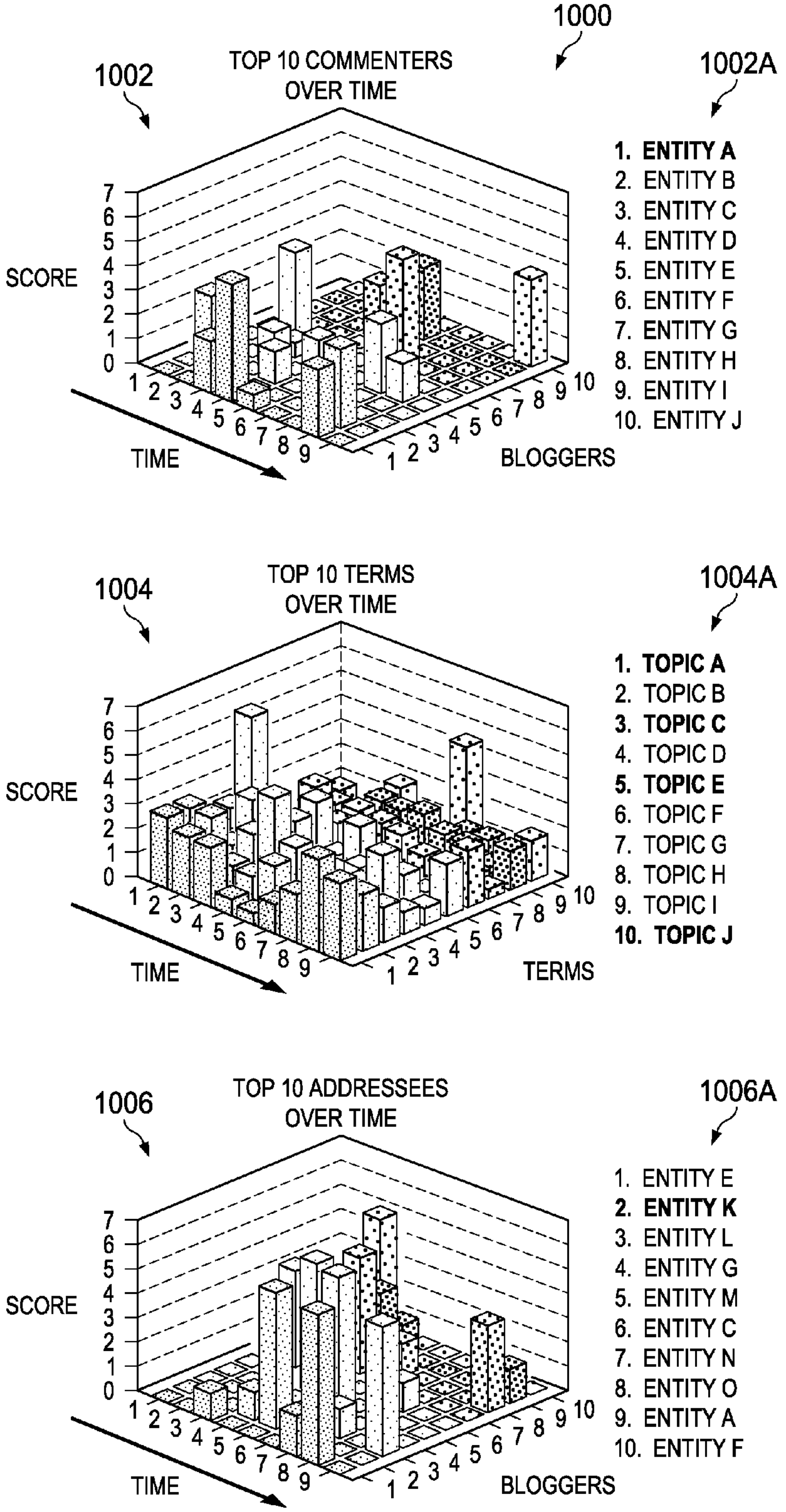
FIG. 10 is an illustration of temporal changes in blogger activities and topics in a social network, as observed from principal component factors, in accordance with an illustrative embodiment.

FIG. 10 is an illustration of temporal changes in blogger activities and topics in a social network, as observed from principal component factors, in accordance with an illustrative embodiment. FIG. 10 represents an example of an output or result that may be obtained using the techniques described elsewhere herein. Model 1000 may represent a tracking of information over time, such as a series of temporal change graphs, like temporal change graph 608 of FIG. 6. Model 1000 may also represent tracking over time of commenters, addressees, and terms, which are described at a single time period in model 902 of FIG. 9.

Like model 902 of FIG. 9, model 1000 may be represented by multiple graphs. In this case, model 1000 includes graph 1002, graph 1004, and graph 1006. Graph 1002 may represent the top 10 commenters and their importance in a social network over time, with commenters listed in list 1002A. Graph 1004 may represent the top 10 terms used over time and their importance, with those terms presented in list 1004A. Graph 1006 may represent the top 10 addressees over time and their importance, with the addressees named in list 1006A. More or fewer graphs may be present. Model 1000 may present information in formats other than graphs.

Figure 12:
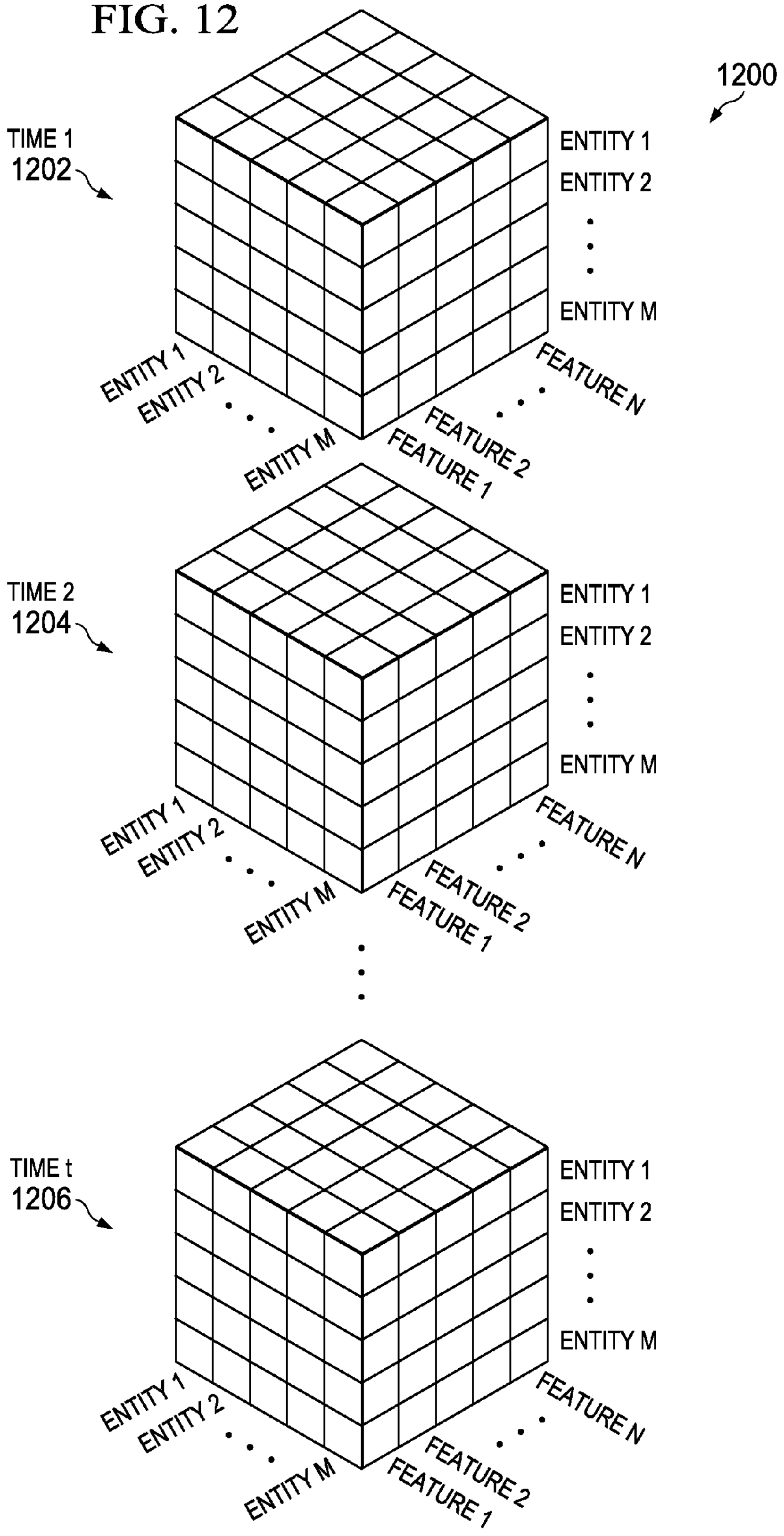
FIG. 12 is an illustration of a four-way tensor incorporating temporal information into a heterogeneous social network, in accordance with an illustrative embodiment.

FIG. 11 through FIG. 14 present additional information regarding the mathematical techniques for carrying out the tensor analysis of social networks, described above. Other mathematical techniques may also be used, so the examples presented in FIG. 11 through FIG. 14 are not necessarily limiting of the claimed inventions. FIG. 11 and FIG. 12 in particular show input representations.

FIG. 11 is an illustration of examples of matrices that represent relations and properties, in accordance with an illustrative embodiment. Each matrix in FIG. 11 may be part of a tensor generated as a result of operation 108 of FIG. 1 or operation 302 of FIG. 2. Each matrix in FIG. 11 may be part of tensor model 204 of FIG. 2, tensor model 406 of FIG. 4, tensor model 504 of FIG. 5, or tensor model 604 of FIG. 6.

Each matrix in FIG. 11 illustrates how different relational information garnered from a social network can be represented quantitatively as a matrix. For example, matrix 1100 shows employer-employee relationship among different entities. In this example, entity 1 is entity 2's boss, but entity m is entity x's boss. The number "1" indicates the entity in the row has a supervisory position relative to the entity in the column. Matrix 1100 is an example of a binary, asymmetrical matrix.

In another example, matrix 1102 shows email relationships among different entities. In this example, entity m emails entity 1 eight times in a time period, as indicated by the number 8 in the corresponding cell of the intersecting row of entity m and column of entity 1. The time period might be a week, as shown, but could be any time period. Likewise, entity 1 emails entity m once a time period, as shown by that corresponding cell. Matrix 1102 is an example of a non-binary, asymmetrical matrix.

In another example, matrix 1104 illustrates the relationships of various entities with respect to eye color. For example, entity 1 and entity 2 have the same eye color, and specifically brown eyes. The color of the eye is indicated by the value of the cell. The fact that any non-zero number is entered into a cell means that the entities for the intersecting column and row have the same eye color. In this case, the number "1" refers to the weight assigned to a match for brown eyes. Likewise, entity x and entity m have blue eyes, which has a larger weight represented by the number "3". Matrix 1104 is an example of a non-binary symmetrical matrix.

In still another example, matrix 1106 illustrates the relationships of various entities with respect to height. Thus, matrix 1106 shows re-representing properties as relationships.

The fact that a non-zero number is in a cell illustrates that two entities share a common range of heights. The value of the number entry in a cell may correspond to a weight of the cell for a match. Thus, for example, a higher number may correspond to a match on a rare feature, such as "blue eyes" in certain geographical regions for persons of a given height, or perhaps corresponds to a rare range of heights for persons in a geographical region.

Matrix 1106 is another example of a non-binary symmetrical matrix. The weights are what make matrix 1106 non-binary.

Although four matrices are shown in FIG. 11, many different matrices quantifying many different relationships may be present. The matrices may be larger or smaller, and may instead be represented by tensors of order three or greater. Thus, the illustrative embodiments of FIG. 11 are exemplary only and do not necessarily limit the claimed inventions.

FIG. 12 is an illustration of a four-way tensor incorporating temporal information into a heterogeneous social network, in accordance with an illustrative embodiment. Four-dimensional tensor 1200 may be a tensor generated as a result of operation 108 or operation 110 of FIG. 1 or operation 302 of FIG. 3. Four-dimensional tensor 1100 may be part of tensor model 204 of FIG. 2, tensor model 406 of FIG. 4, tensor model 504 of FIG. 5, or tensor model 604 of FIG. 6.

Four-dimensional tensor 1200 is an example of a four-dimensional tensor that may be represented as a series of three-dimensional tensors, such as a series of three-dimensional tensors representing the same network that varies over time. Note, however, that not all mathematical algorithms operating on different representations of four dimensional tensors produce the same results. Nevertheless, tensor 1200 illustrates a four-dimensional tensor describing an entity-by-entity-by-feature-by-time set of relationships that incorporates temporal information into a heterogeneous social network.

However, in FIG. 12, each of three-dimensional tensors 1202, 1204, and 1206 show the same entities and represent the same properties that vary over time. For example, three-dimensional tensor 1202 is a state of the entities and relationships among the entities at time 1, three-dimensional tensor 1204 is a state of the entities and relationships among the entities at time 2, and three-dimensional tensor 1206 is a state of the entities and relationships among the entities at time t.

Although a four-dimensional tensor, represented as a series of three-dimensional tensors over time, is shown in FIG. 12, the illustrative embodiments contemplate higher and lower order tensors. For example, four-dimensional tensor 1200 could be replaced by a series of three-dimensional tensors, representing relationships over time. In contrast, four-dimensional tensor 1200 could be replaced by a higher order tensor, such as in a non-limiting example, a ten-dimensional tensor represented by a series of nine-dimensional tensors over time. Such a higher order tensor can be treated mathematically according to known techniques, but may be difficult to visualize. Nevertheless, the example shown in FIG. 12 is exemplary only and is not necessarily limiting of the claimed inventions.

Figure 13:
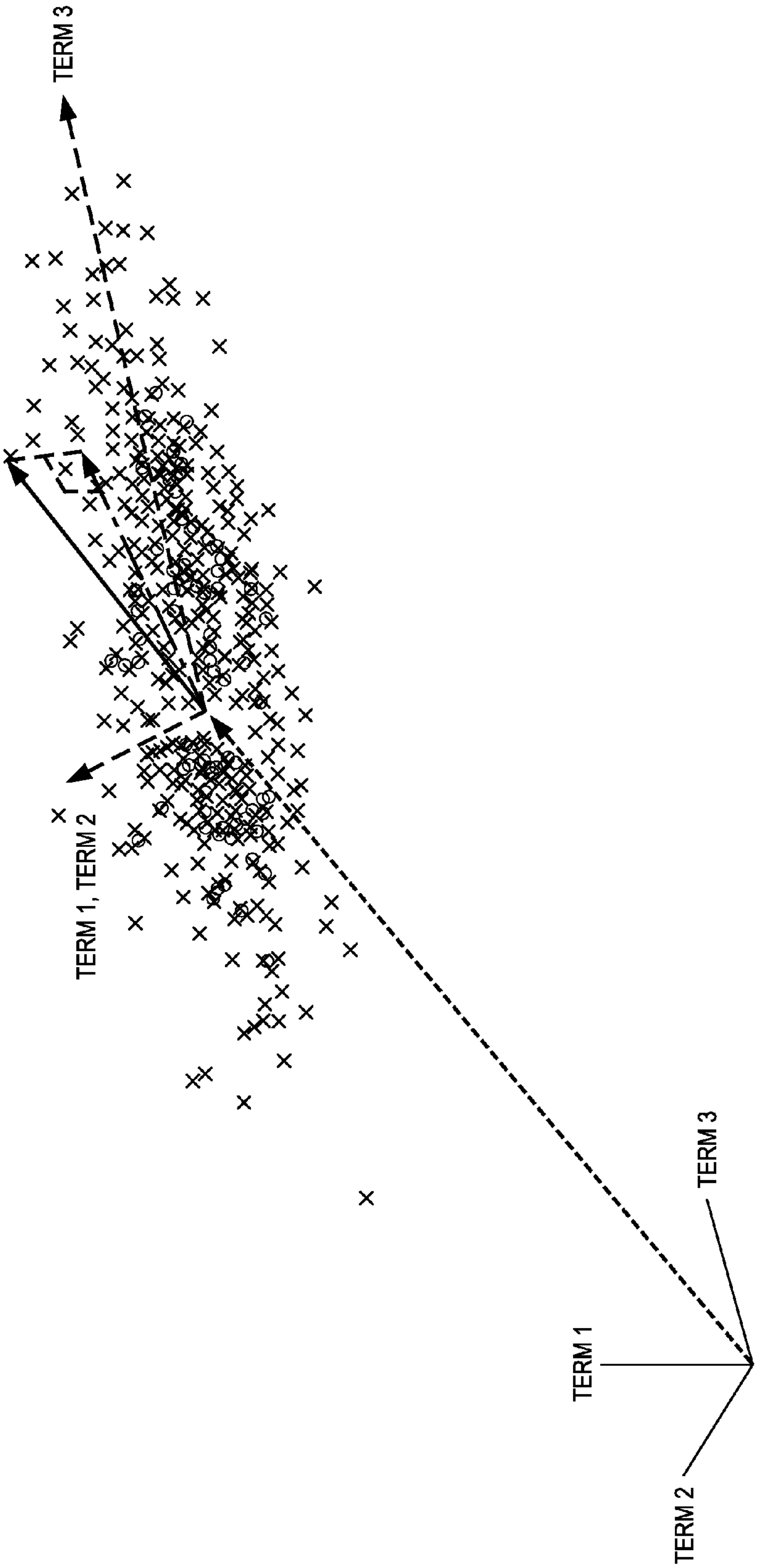
FIG. 13 is an illustration of principal component analysis, in accordance with an illustrative embodiment.

FIG. 13 is an illustration of principal component analysis, in accordance with an illustrative embodiment. As defined above, principal component analysis (PCA) is a mathematical statistical procedure that uses a linear orthogonal transformation to convert a set of observations of possibly correlated variables into a set of values of independent variables called principal components.

Specifically, FIG. 13 shows how a vast amount of data may be vetted for more relevant information while limiting or eliminating loss of information. First, center axes are established within the data, with the center axes representing directions within the data along which the most relevant data can be found. Second, the principal components are found.

Third, the process may project data onto the principal components. In this manner the most relevant data may be found. Fourth, the principal components may be interpreted. The result of interpretation may be a model, including a multi-dimensional tensor representing information of greatest interest.

A "principal factor" is a tensor analogue to a "principal component" of a matrix. Principal factors are analogous to principal components, but the terms are not identical. A principal factor is a projection of a tensor onto a vector space with only one direction. Just as principal components can be used to focus on important information in a matrix, a projection principal factor may be used to focus on information of interest in a higher order tensor. A principal factor may be derived using one or more other mathematical approximation techniques operating on the set of data. A summary tensor may be constructed from one or more principal factors.

FIG. 14 is an illustration of different mathematical matrix and tensor decomposition techniques, in accordance with an illustrative embodiment, showing graphically how the tensor decompositions parallel matrix decomposition via singular value decomposition (SVD). Those of ordinary skill in the art of tensor mathematics can read and understand the equations presented in FIG. 14.

Singular Value Decomposition (SVD) 1400 may be, for example, the mathematical matrix decomposition technique applied in FIG. 13. Parallel factor analysis (PARAFAC) 1402 may be, for example, the mathematical tensor decomposition technique applied in FIG. 5 or FIG. 6. Higher-order singular value decomposition (HOSVD) 1404 may be, for example, another mathematical tensor decomposition technique applied in FIG. 4.

The two mathematical tensor decomposition techniques described with respect to parallel factor analysis (PARAFAC) 1402 and Higher-order singular value decomposition (HOSVD) 1404 in FIG. 14 are exemplary only. Other mathematical tensor decomposition techniques may be used with respect to the tensor analysis or decomposition operations described elsewhere herein. Thus, the illustrative embodiments described in FIG. 14 are not necessarily limiting of the claimed inventions.

Figure 15:
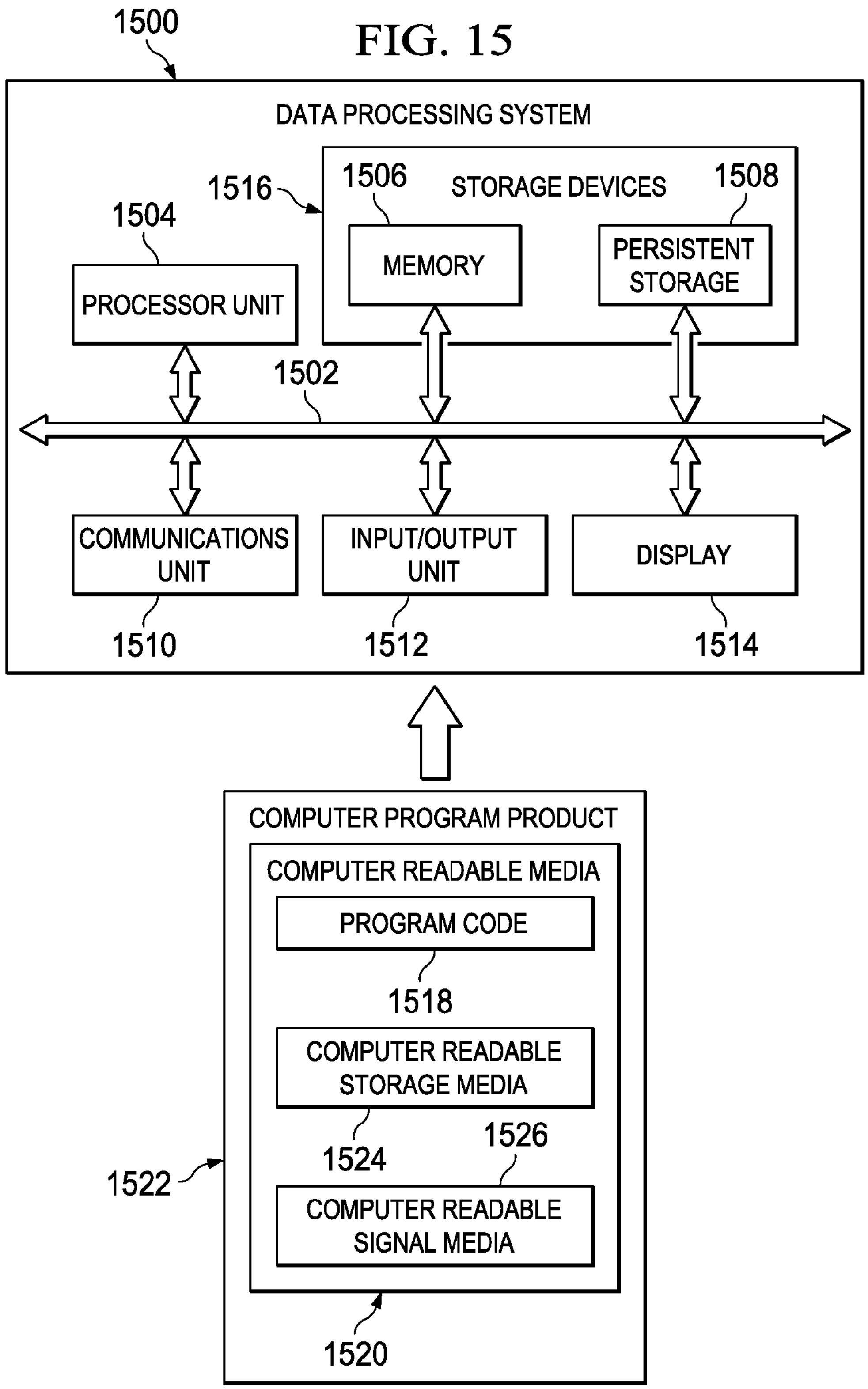
FIG. 15 is an illustration of a data processing system, in accordance with an illustrative embodiment.

Turning now to FIG. 15, an illustration of a data processing system is depicted in accordance with an illustrative embodiment. Data processing system 1500 in FIG. 15 is an example of a data processing system that may be used to implement the illustrative embodiments, such as system 200 of FIG. 2, or any other module or system or process disclosed herein. In this illustrative example, data processing system 1500 includes communications fabric 1502, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. Processor unit 1504 may be a number of processors, a multi core processor, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 may also be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. Display 1514 provides a mechanism to display information to a user.

Instructions for the operating system, applications, and/or programs may be located in storage devices 1516, which are in communication with processor unit 1504 through communications fabric 1502. In these illustrative examples, the instructions are in a functional form on persistent storage 1508. These instructions may be loaded into memory 1506 for execution by processor unit 1504. The processes of the different embodiments may be performed by processor unit 1504 using computer implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526. Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 may also take the form of a persistent storage, such as a hard drive, a thumb drive, or a flash memory, that is connected to data processing system 1500. In some instances, computer readable storage media 1524 may not be removable from data processing system 1500.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1518 may be omitted because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

As another example, a storage device in data processing system 1500 is any hardware apparatus that may store data. Memory 1506, persistent storage 1508, and computer readable media 1520 are examples of storage devices in a tangible form.

In another example, a bus system may be used to implement communications fabric 1502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1506, or a cache, such as found in an interface and memory controller hub that may be present in communications fabric 1502.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:

processing social network data using one or more processors to establish a tensor model of the social network data, the tensor model having at least an order of four;

decomposing the tensor model using the one or more processors into a plurality of principal factors, wherein each principle factor of the plurality of principal factors refers to a corresponding set of vectors whose corresponding outer products are corresponding rank-one tensors which results from tensor decomposition, and wherein the each principal factor comprises a corresponding projection of the tensor model onto tensor space with only one corresponding direction that combines information from all dimensions of the tensor model;

synthesizing, using the one or more processors, and from a subset of the plurality of principal factors, a summary tensor representing a plurality of relationships among a plurality of entities in the tensor model, such that a synthesis of relationships is formed and stored in one or more non-transitory computer readable storage media;

identifying, using the one or more processors and further using one of the summary tensor and a single principal factor in the subset, at least one parameter selected from the group consisting of: a correlation among the plurality of entities, a similarity between two of the plurality of entities, and a time-based trend of changes in the synthesis of relationships; and communicating the at least one parameter.

2. The method of claim 1, wherein a relationship in the plurality of relationships is established by a commonality among two entities represented in the tensor model.

3. The method of claim 1, wherein the plurality of relationships include a relationship between a first person and a second person.

4. The method of claim 1, wherein the plurality of relationships includes a relationship between a person or an organization and a non-person object or event.

5. The method of claim 1, wherein the plurality of relationships include a relationship between a document and a word, phrase, or string.

6. The method of claim 5, wherein the word, phrase, or string comprises an identification phrase of a third party social network service.

7. The method of claim 1, wherein the parameter consists of the correlation among the plurality of entities, and wherein identifying further comprises:

receiving a specification of a first entity modeled in the tensor model;

selecting the single principal factor, wherein the single principal factor assigns a first weight to the first entity, wherein the first weight is large, and wherein large comprises one weight in a specified number of weights assigned to entities in the single principal factor or a weight in the single principal factor that is larger than a predetermined threshold; and identifying a second entity modeled in the tensor model that is related to the first entity, wherein identifying the second entity is based on the second entity being assigned a second weight in the single principal factor, wherein the second weight is large.

8. The method of claim 1, wherein the parameter consists of the similarity between two of the plurality of entities, and wherein identifying further comprises:

comparing a first sub-tensor of the summary tensor, representing one of a first entity or a first complex entity, to a second sub-tensor of the summary tensor, representing one of a second entity or a second complex entity, wherein comparing uses one of a distance metric or a similarity metric.

9. The method of claim 8, wherein the first sub-tensor comprises a first N−1 sub-tensor relative to the summary tensor and the second sub-tensor comprises a second N−1 sub-tensor relative to the summary tensor, wherein "N" comprises a dimensionality of the tensor model, and wherein the first sub-tensor and the second sub-tensor have a same tensor order.

10. The method of claim 1 further comprising:

modeling, based on the at least one parameter, a content of the social network.

11. The method of claim 10 further comprising:

modeling, based on the at least one parameter, a change in the content.

12. The method of claim 1, wherein the tensor model comprises a four dimensional tensor comprising a time-based sequence of three dimensional tensors.

13. The method of claim 1, wherein the at least one parameter consists of the time-based trend of changes, and wherein the time-based trend of changes is modeled by overlapping time windows of the tensor model to approximate sequencing in the tensor model.

14. The method of claim 1, wherein establishing the tensor model includes incorporating relationships among entities, non-relational attributes of the entities into a single tensor representation, or both, wherein the entities are in the tensor model.

15. The method of claim 1, wherein the at least one parameter consists of the correlation among the plurality of entities, wherein the plurality of entities consists of an identification phrase of a third party social network service and a topic of discussion.

16. A system comprising:

a modeler configured to establish a tensor model of social network data, the tensor model having at least an order of four;

a decomposer configured to decompose the tensor model into a plurality of principal factors, wherein each principle factor of the plurality of principal factors refers to a corresponding set of vectors whose corresponding outer products are corresponding rank-one tensors which results from tensor decomposition, and wherein the each principal factor comprises a corresponding projection of the tensor model onto tensor space with only one corresponding direction that combines information from all dimensions of the tensor model;

a synthesizer configured to synthesize, from a subset of the plurality of principal factors, a summary tensor representing a plurality of relationships among a plurality of entities in the tensor model, such that a synthesis of relationships is formed and stored in one or more non-transitory computer readable storage media;

a correlation engine configured to identify, using one of the summary tensor and a single principal factor in the subset, at least one parameter selected from the group consisting of: a correlation among the plurality of entities, a similarity between two of the plurality of entities, and a time-based trend of changes in the synthesis of relationships; and an output device configured to communicate the at least one parameter.

17. The system of claim 16, wherein the modeler, the decomposer, the synthesizer, the correlation engine, and the output device are all embodied as a computer system.

18. The system of claim 16, wherein the decomposer is further configured to:

receive a specification of a first entity modeled in the tensor model;

select the single principal factor, wherein the single principal factor assigns a first weight to the first entity, wherein the first weight is large, and wherein large comprises one weight in a specified number of weights assigned to entities in the single principal factor or a weight in the single principal factor that is larger than a predetermined threshold; and identify a second entity modeled in the tensor model that is related to the first entity, wherein identifying the second entity is based on the second entity being assigned a second weight in the single principal factor, wherein the second weight is large.

19. The system of claim 16, wherein the plurality of relationships include a relationship between a document and a word, phrase, or string and wherein the word, phrase, or string comprises an identification phrase of a third party social network service.

20. The system of claim 16, wherein the parameter consists of the similarity between two of the plurality of entities, and wherein the correlation engine is further configured to identify by comparing a first sub-tensor of the summary tensor, representing one of a first entity or a first complex entity, to a second sub-tensor of the summary tensor, representing one of a second entity or a second complex entity, wherein comparing uses one of a distance metric or a similarity metric.

* * * * *